US 7,171,415 B2

(12) United States Patent
Kan et al.

(10) Patent No.: US 7,171,415 B2
(45) Date of Patent: *Jan. 30, 2007

(54) DISTRIBUTED INFORMATION DISCOVERY THROUGH SEARCHING SELECTED REGISTERED INFORMATION PROVIDERS

(75) Inventors: Gene H. Kan, Belmont, CA (US); Yaroslav Faybishenko, Berkeley, CA (US); Douglass R. Cutting, Petaluma, CA (US); Thomas J. Camarda, Staten Island, NY (US); David M. Doolin, El Cerrito, CA (US); Steve Waterhouse, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 873 days.

This patent is subject to a terminal disclaimer.

(21) Appl. No.: 09/872,360

(22) Filed: May 31, 2001

(65) Prior Publication Data
US 2003/0088544 A1    May 8, 2003

Related U.S. Application Data

(60) Provisional application No. 60/288,848, filed on May 4, 2001.

(51) Int. Cl.
*G06F 17/30* (2006.01)

(52) U.S. Cl. ........................................ 707/10; 709/217
(58) Field of Classification Search .............. 707/1–10; 709/217
See application file for complete search history.

(56) References Cited

U.S. PATENT DOCUMENTS 5,446,880 A    8/1995    Balgeman et al. ............. 707/9

(Continued)

FOREIGN PATENT DOCUMENTS

EP    829 811    3/1998

(Continued)

OTHER PUBLICATIONS

Brian Thomas, "URL Diving," The International Society for Optical Engineering, May-Jun. 1998, IEEE Internet Computing, pp. 92-93.

(Continued)

*Primary Examiner*—Jack M. Choules
(74) *Attorney, Agent, or Firm*—Robert C. Kowert; Meyertons, Hood, Kivlin, Kowert & Goetzel, P.C.

(57) ABSTRACT

A distributed network search mechanism may be provided for consumers coupled to a network to search information providers coupled to the network. Consumers may make search requests according to a query routing protocol. A network hub may be configured to receive search requests from consumers. The hub may also receive registration requests from information providers according to the query routing protocol. Information providers register with the hub to indicate search queries in which they are interested in receiving. When a query request is received, the hub resolves the query request with a provider registration index. The hub matches search query information from the query request with provider registrations to determine which providers have registered to receive search queries like the current search query. The hub then routes the search query to matching providers according to the query routing protocol.

52 Claims, 13 Drawing Sheets

U.S. PATENT DOCUMENTS

| | | | |
|---|---|---|---|
| 5,577,241 A | 11/1996 | Spencer | 707/5 |
| 5,659,732 A | 8/1997 | Kirsch | 707/5 |
| 5,751,611 A | 5/1998 | Jamieson | 345/35 |
| 5,826,261 A | 10/1998 | Spencer | 707/5 |
| 5,832,506 A | 11/1998 | Kuzma | |
| 5,845,278 A | 12/1998 | Kirsch et al. | |
| 5,848,234 A | 12/1998 | Chernick et al. | |
| 5,895,454 A | 4/1999 | Harrington | |
| 5,920,854 A | 7/1999 | Kirsch et al. | 707/3 |
| 5,920,856 A | 7/1999 | Syeda-Mahmood | 707/3 |
| 5,924,105 A | 7/1999 | Punch, III et al. | 715/513 |
| 5,933,822 A | 8/1999 | Braden-Harder et al. | 707/5 |
| 5,987,454 A | 11/1999 | Hobbs | 707/4 |
| 6,006,217 A | 12/1999 | Lumsden | 707/2 |
| 6,047,286 A | 4/2000 | Burrows | 707/4 |
| 6,055,538 A | 4/2000 | Kessenich et al. | 707/101 |
| 6,070,158 A | 5/2000 | Kirsch et al. | 707/3 |
| 6,094,649 A | 7/2000 | Bowen et al. | 707/3 |
| 6,102,969 A | 8/2000 | Christianson et al. | 717/146 |
| 6,105,019 A | 8/2000 | Burrows | 707/2 |
| 6,145,003 A | 11/2000 | Sanu et al. | 709/225 |
| 6,161,102 A | 12/2000 | Yanagihara et al. | 707/3 |
| 6,212,545 B1 | 4/2001 | Ohtani et al. | 707/202 |
| 6,233,571 B1 | 5/2001 | Egger et al. | 707/2 |
| 6,256,623 B1 | 7/2001 | Jones | 707/3 |
| 6,269,361 B1 | 7/2001 | Davis et al. | 707/3 |
| 6,275,820 B1 | 8/2001 | Navin-Chandra et al. | 707/3 |
| 6,278,993 B1 | 8/2001 | Kumar et al. | 707/3 |
| 6,292,802 B1 | 9/2001 | Kessenich et al. | 707/101 |
| 6,317,741 B1 | 11/2001 | Burrows | 707/5 |
| 6,327,590 B1 | 12/2001 | Chidlovskii et al. | 707/5 |
| 6,347,314 B1 | 2/2002 | Chidlovskii | 707/3 |
| 6,434,548 B1 | 8/2002 | Emens et al. | 707/3 |
| 6,442,544 B1 | 8/2002 | Kohli | 707/5 |
| 6,453,315 B1 | 9/2002 | Weissman et al. | 707/5 |
| 6,480,837 B1 | 11/2002 | Dutta | 707/3 |
| 6,480,860 B1 * | 11/2002 | Monday | 707/10 |
| 6,484,166 B1 | 11/2002 | Maynard | 707/5 |
| 6,490,575 B1 | 12/2002 | Berstis | 707/3 |
| 6,510,406 B1 | 1/2003 | Marchisio | 704/9 |
| 6,523,022 B1 | 2/2003 | Hobbs | 707/3 |
| 6,523,026 B1 | 2/2003 | Gillis | 707/3 |
| 6,523,029 B1 | 2/2003 | Kulyukin | 707/5 |
| 6,523,037 B1 | 2/2003 | Monahan et al. | 707/10 |
| 6,526,400 B1 | 2/2003 | Takata et al. | 707/3 |
| 6,560,600 B1 | 5/2003 | Broder | 707/7 |
| 6,574,655 B1 | 6/2003 | Libert et al. | 709/200 |
| 6,615,209 B1 | 9/2003 | Gomes et al. | 707/5 |
| 6,647,383 B1 | 11/2003 | August et al. | 707/3 |
| 6,650,998 B1 | 11/2003 | Rutledge et al. | 701/211 |
| 6,665,655 B1 | 12/2003 | Warner et al. | 707/2 |
| 6,687,696 B2 | 2/2004 | Hofmann et al. | 707/6 |
| 6,704,726 B1 | 3/2004 | Amouroux | 707/4 |
| 6,711,568 B1 | 3/2004 | Bharat et al. | 707/5 |
| 6,718,324 B2 | 4/2004 | Edlund et al. | 707/5 |
| 6,725,425 B1 | 4/2004 | Rajan et al. | 715/513 |
| 6,757,646 B2 | 6/2004 | Marchisio | 707/8 |
| 6,757,675 B2 | 6/2004 | Aiken et al. | 707/3 |
| 6,763,362 B2 | 7/2004 | McKeeth | 707/104.1 |
| 6,785,670 B1 | 8/2004 | Chiang et al. | 707/3 |
| 6,785,671 B1 | 8/2004 | Bailey et al. | 707/3 |
| 6,789,077 B1 * | 9/2004 | Slaughter et al. | 707/10 |
| 6,799,176 B1 | 9/2004 | Page | 707/5 |
| 6,801,906 B1 | 10/2004 | Bates et al. | 707/3 |
| 6,807,539 B2 | 10/2004 | Miller et al. | 707/3 |
| 6,807,546 B2 | 10/2004 | Young-Lai | 707/102 |

FOREIGN PATENT DOCUMENTS

| | | |
|---|---|---|
| WO | 00/62264 | 10/2000 |

OTHER PUBLICATIONS

International Search Report for PCT/US02/13577, mailed Oct. 10, 2003, 6 pages.

Sun Microsystems, Inc., "Project JXTA: An Open, Innovative Collaboration", Apr. 24, 2001, XP-002252285, pp. 1-5.

Gravano, et al., "STARTS: Stanford Proposal for Internet Meta-Searching," 1997, ACM, XP000730508, pp. 207-218.

Sun Microsystems, Inc., Li Gong, "Project JXTA: A Technology Overview," XP002252710, Apr. 25, 2001, pp. 1-11.

James Powell, "Multilingual Federated Searching Across Heterogeneous Collections," D-Lib Magazine, Sep. 1998, XP002255043, 10 pages.

Florescu, et al., "Integrating Keyword Search into XML Query Processing," Computer Networks, Published by Elsevier Science B.V., 2000, 17 pages.

International Search Report for PCT/US 02/13577 mailed Oct. 22, 2003, 6 pages.

C. Yu, et al., "Efficient and Effective Metasearch for a Large Number of Text Databases," Tech. report, U. of Illinois at Chicago, 1999, http://citeseer.ist.psu.edu/yu99efficient.html, 2 pages.

W. Meng, et al., "Estimating the Usefulness of Search Engines," 15th International Conference on Data Engineering (ICDE'99), Sydney, Australia, Mar. 1999, 2 pages.

Mic Bowman, et al. "Harvest: A scalable, customizable discovery and access system", Technical report, University of Colorado-Boulder, 1995, 3 pages.

Oates, T.; et al., "Parallel and distributed search for structure in multivariate time series," Technical Report 96-23, University of Massachusetts at Amherst, Computer Science Department, Long version, 1996, 2 pages.

T. Oates, et al., "Networked Information Retrieval as Distributed Problem Solving," In Proceedings of CIKM Workshop on Intelligent Information Agents held in conjunction with the Third International Conference on Information and Knowledge Management (CIKM'94), Dec. 1994, 2 pages.

Walter L. Warnick, PhD, et al., "Searching the Deep Web," D-Lib Magazine, Jan. 2001, vol. 7, No. 1, 11 pages.

Julio C. Navas, et al., "Jambalaya: Using Multicast for Blind Distributed Web Searching and Advertising," 1998, 1 page.

Fidel Cacheda, et al., "Improving the Information Retrieval in the World Wide Web (2000)," 1 page.

L. Warshaw, et al., "Rule-based query optimization, revisited," Proceedings of the 9th Conference on Information and Knowledge Management. Kansas City, Kansas, Nov. 1999, pp. 267-275.

James P. Callan, et al. "Searching distributed collections with inference networks," In Proceedings of the 18th Annual SIGIR Conference, 1995, 2 pages.

* cited by examiner

Peers, clients and services

Peer-to-peer platform message

Content ID

Peer-to-peer sharing layers

| Element Name (A String) | Element Value Type |
|---|---|
| Policy Name | A non-canonical resource name (suitable for UI display) |
| Policy Keywords | String[] |
| Policy Resolver | <Peer Endpoint> to which the query generation and resolve messages are to be sent |

FIG. 13
Policy Advertisement

| Element Name (A String) | Element Value Type |
|---|---|
| Peer Endpoint | <Peer Endpoint[]> |

FIG. 14
Peer Advertisement

| Element Name (A String) | Element Value Type |
|---|---|
| Membership Application Policy | <Policy Advertisement> |
| New Member Approval Policy (Authentication) | <Policy Advertisement> |
| Content Sharing Policy | <Policy Advertisement> |
| Peer Discovery Policy | <Policy Advertisement> |
| Policy Resolver Policy | <Policy Advertisement> |
| Pipe Resolver Policy | <Policy Advertisement> |

FIG. 15
Peer Group Advertisement

| Element Name (A String) | Element Value Type |
|---|---|
| Direction | <Pipe Direction> (In or Out) |

FIG. 16
Pipe Advertisement

| Element Name (A String) | Element Value Type |
|---|---|
| Access Policy | <Policy Advertisement> |

FIG. 17
Service Advertisement

| Element Name (A String) | Element Value Type |
|---|---|
| Type (Optional) | String |
| Size (Required) | Long |
| Encoding (Required) | <By Value> or <By Reference> |
| Content ID (Required) | <Content ID> |
| About ID (Optional) | <Content ID> |
| Peer ID (Optional) | <Peer Advertisement> |

FIG. 18
Content Advertisement

Networking protocol stack

DISTRIBUTED INFORMATION DISCOVERY THROUGH SEARCHING SELECTED REGISTERED INFORMATION PROVIDERS

This application claims benefit of priority to Provisional Application Ser. No. 60/288,848 filed May 4, 2001.

BACKGROUND OF THE INVENTION

1. Field of the Invention

This invention relates to computer networks, and more particularly to a system and method for providing a distributed information discovery platform that enables discovery of information from distributed information providers.

2. Description of the Related Art

It has been estimated that the amount of content contained in distributed information sources on the public web is over 550 billion documents. In comparison, leading Internet search engines may be capable of searching only about 600 million pages out of an estimated 1.2 billion "static pages." Due to the dynamic nature of Internet content, much of the content is unsearchable by conventional search means. In addition, the amount of content unsearchable by conventional means is growing rapidly with the increasing use of application servers and web enabled business systems.

Conventional, crawler-based search engines such as Google are applicable for indexing static, slowly changing web pages such as home pages or corporate information pages. Crawlers currently may take three months or more to crawl and index the web (Google numbers). Targeted or restricted crawling of headline or other metadata is possible (such as that done by moreover.com).

Some web resources may not have a "page of contents" or similar index. As an example, Amazon.com contains millions of product descriptions in its databases but does not have a set of pages listing all these descriptions. As a result, in order to crawl such a resource, it may be necessary to query the database repeatedly with every conceivable query term until all products were extracted. Since many web pages are generated dynamically given information about the consumer or context of the query (time, purchasing behavior, location, etc.), a crawler approach is likely to lead to distortion of such data. In some situations, content may be inaccessible due to access privileges (e.g. a subscription site), or for security reasons (e.g. a secure content site).

Conventional search mechanisms may be less efficient than desirable in regard to some types of providers. For example, consider the role of a crawler-type search mechanism accessing dynamic content from a news site. A current news provider may provide content created by editors and stored in a database as XML or other presentation neutral form. The news provider's application server may render the content as a web page with associated links using current templates. The end user may see a well-presented page with the story they were looking for. However, when a crawler-type search engine hits the page all it sees is a mess of HTML. In order to extract the content of the story, it must be programmed to use information about the structure of the HTML page to "scrape" the content and headline from the page. It may then store this content or a processed version for indexing purposes in its own database, and retrieve the link and story when a query matching the story is submitted. This process from database to HTML and back to database is inherently inefficient and prone to errors. In addition it gives the content provider no control over the format of the article or the decision about which article to show in response to a query.

SUMMARY OF THE INVENTION

A distributed network search mechanism may be provided for consumers coupled to a network to search information providers coupled to the network. Consumers may make search requests according to a query routing protocol. A network hub may be configured to receive search requests from consumers. The hub may also receive registration requests from information providers according to the query routing protocol. Information providers register with the hub to indicate search queries in which they are interested in receiving. To request registration, a provider may send a registration file to the hub according to the query routing protocol. The registration file includes an indication of query requests that the provider desires to receive and a query server address for the provider. The hub maintains an index of provider registrations. When a query request is received, the hub resolves the query request with the provider registration index. The hub matches search query information from the query request with provider registrations to determine which providers have registered to receive search queries like the current search query. The hub then routes the search query to matching providers according to the query routing protocol.

Each provider receiving a search query according to the query routing protocol may respond with search results according to the query routing protocol. Each provider is able to provide or customize its search results as it sees fit. The hub collates response from providers and sends the collated search in a query response to the consumer according to the query routing protocol. The query routing protocol specifies a mark-up language format for communicating query requests, query responses and registration requests.

In an embodiment, a network hub may be configured to implement a search method according to a query routing protocol. The method may include receiving a query request from a consumer. The query request may include a search query. The method may include resolving the search query with an index of provider registrations to select one or more provider registrations. The search query may then be routed to at least one provider specified by the one or more selected provider registrations. A query response may be received from said at least one provider. The query response includes search results. Search results are routed to the consumer.

The query request and the query response are formatted according to a query routing protocol. The query routing protocol specifies a mark-up language format for communicating query requests and query responses. A search query may include an indication of a query-space. The query-space defines a structure for indicating and matching search criteria and search criteria structured according to the indicated query-space.

Each provider registration may include an indication of a query-space. The query-space defines a structure for indicating and matching search criteria. The provider registration may also include a predicate statement structured according to the indicated query-space. The predicate statement defines matching search criteria. The provider registration may also include a query server address to which matching search queries are to be directed.

Resolving a search query may include applying the search criteria from the search query to the provider registrations indicating the same query-space as the search query, and selecting the provider registrations that have both the same query-space as said search query and a predicate statement matching the search criteria from the search query. The search query may be routed to the query server addresses specified by one or more of the provider registrations selected by said resolving.

Registering providers may involve receiving registration requests from a plurality of providers. Each registration request includes a registration file. The registration file includes an address and a definition of search queries to be sent to the address. The registration files may be stored in the index of provider registrations. The registration requests, the query request and the query response are all formatted according to a query routing protocol, wherein the query routing protocol specifies a mark-up language format for communicating query requests, query responses and registration requests.

BRIEF DESCRIPTION OF THE DRAWINGS

FIG. 13 illustrates one embodiment of a policy advertisement;

FIG. 14 illustrates one embodiment of a peer advertisement;

FIG. 15 illustrates one embodiment of a peer group advertisement;

FIG. 16 illustrates one embodiment of a pipe advertisement;

FIG. 17 illustrates one embodiment of a service advertisement;

FIG. 18 illustrates one embodiment of a content advertisement; and

Figure 1:
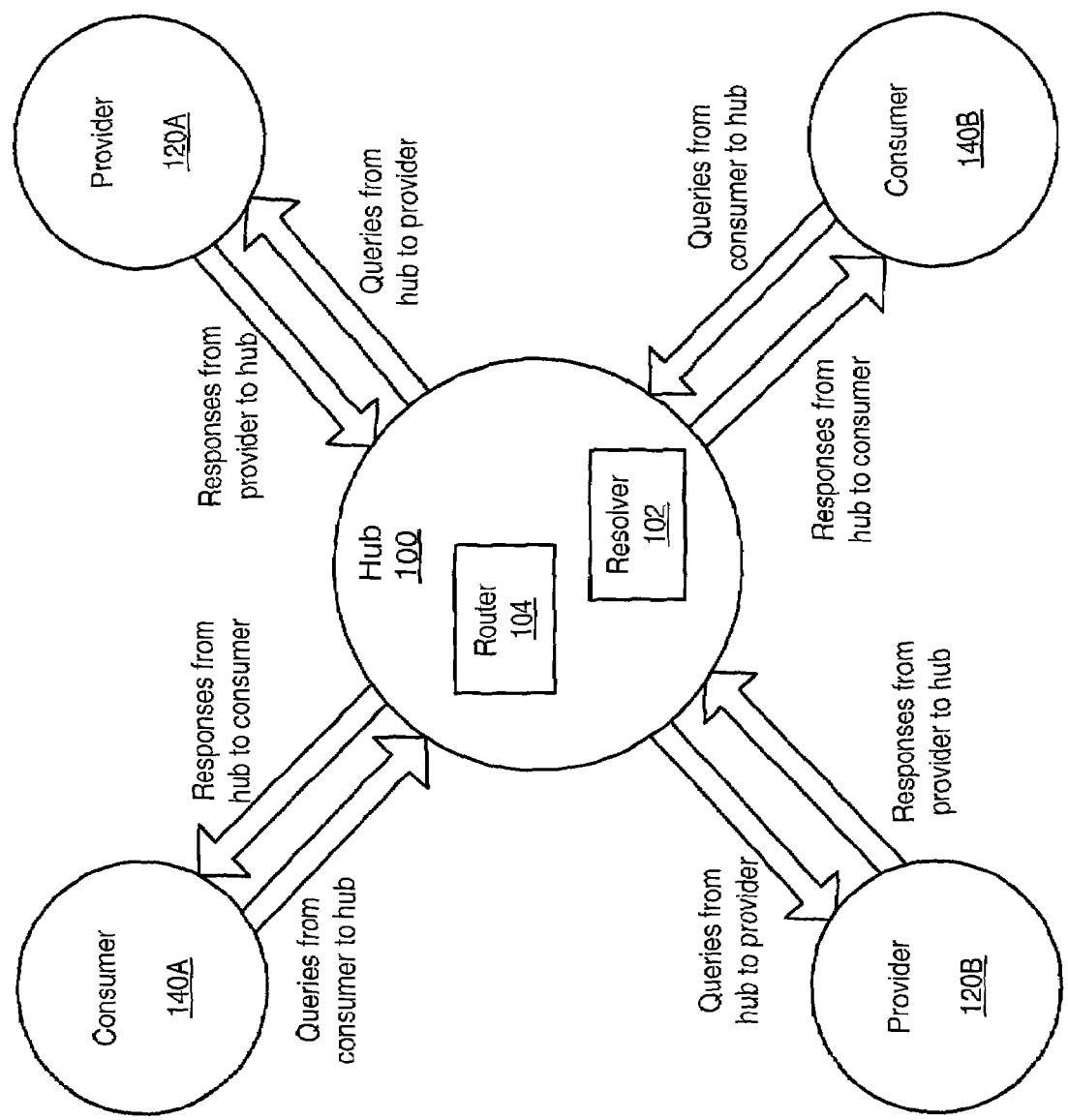
FIG. 1 illustrates a network utilizing the distributed information discovery platform according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing a distributed information discovery platform that enables discovery of up-to-date information from distributed information providers is described. In an embodiment, in contrast to conventional search engines and exchanges, the distributed information discovery platform does not centralize information; rather it may search for information in a distributed manner. This distributed searching may enable content providers to deliver up-to-the-second responses to search queries from a user or client.

In the distributed information discovery platform, queries are distributed to "peers" in a network who are most likely to be capable of answering the query. The distributed information discovery platform provides a common distributed query mechanism for devices from web servers and small computers. The distributed information discovery platform may be applied to a wide variety of domains: from public accessible web search to private networks of trading partners to interaction between distributed services and applications, for example.

The distributed information discovery platform may be applied in a wide variety of domains, including, but not limited to: public accessible web search, private networks of trading partners, and interaction between distributed services and applications. The distributed information discovery platform may also be applied to Peer-to-Peer (P2P) networking, exemplified in programs such as Napster and Gnutella. For example, in one embodiment the distributed information discovery platform may include a web front end to a distributed set of servers, each running a P2P node and responding to queries. Each node may be registered (or hard coded in some embodiments) to respond to certain queries or kinds of queries. For example, one of the nodes may include a calculator service which would respond to a numeric expression query with the solution. Other nodes may be configured for file sharing and may be registered to respond to certain queries. A search query on a corporate name may return an up-to-the-minute stock quote and current news stories on the corporation. Instead of presenting only text-based search results, the distributed information discovery platform may return other visual or audio search results. For example, a search query for "roses" may return photo images of roses.

In some embodiments, the distributed information discovery platform may leverage web technologies (e.g. HTTP/XML). These technologies may provide a more familiar environment to developers and webmasters than less common or proprietary protocols. In addition, leveraging such web technologies may simplify a user's task in interfacing to the query routing protocol of the distributed information discovery platform.

The distributed information discovery platform may provide an abstract query routing service for networks with arbitrary messaging and transport mechanisms. In one embodiment, the distributed information discovery platform may bind with the Web (e.g. XML over HTTP). In one embodiment, the distributed information discovery platform may bind with a peer-to-peer networking environment. In a peer-to-peer networking environment, entities of the distributed information discovery platform (e.g. consumers, providers, hubs, registration services, etc.) may be implemented on peers in the network. Each peer may run instances of the provider, consumer and registration services on top of its peer-to-peer networking core. Each peer may interact with an instance of a hub service, itself running on top of the peer-to-peer networking core. One peer-to-peer networking environment with which the distributed information discovery platform may bind is implemented with a novel open network computing platform for peer-to-peer networks, which may be referred to as a peer-to-peer platform. This peer-to-peer networking environment is described later in this document.

There may be some differences in some of the internal mechanics of embodiments that bind to different networks. In general, the query routing protocol and the resolution mechanism may be the same or similar in the different embodiments. The routing mechanism and the client interfaces in the different embodiments, however, may be implemented at least partially differently to support the different network types.

In addition to functioning as a "meta-search" engine, the distributed information discovery platform may include support for an open protocol for distributed information routing. This protocol for distributed information routing may be referred to as a query routing protocol. The query routing protocol may define mechanisms for sending and responding to queries in the network, in addition to mechanisms for defining metadata for nodes in the network. In one embodiment, the common query routing protocol may allow participants to exchange information seamlessly without having to understand the structure of their presentation layers. In one embodiment, this query routing protocol allows information providers to publish a description of queries that they are willing to answer. Information consumers may submit queries to the network, which routes each query to all interested providers. The query routing protocol allows participants in the network to exchange information in a seamless manner without having to understand the structure of the presentation layers.

The query routing protocol may be based on existing open standards, including markup languages such as XML (eXtensible Mark-up Language) and XML Schema. In addition, the query routing protocol may be encapsulated within existing protocols, such as HTTP (HyperText Transfer Protocol).

In some embodiments, the query routing protocol of the distributed information discovery platform may provide an interface designed for simplicity. For example, a minimally-conforming client implementation may be built in one embodiment using existing libraries for manipulating XML and sending HTTP messages. A minimally-conforming server implementation may be built in one embodiment with the above tools plus a generic HTTP server.

The query routing protocol of the distributed information discovery platform may also provide structure. For example, in one embodiment, queries on a distributed information discovery network may be made using XML messages conforming to a particular schema or queryspace. In such an embodiment, information providers may register "templates" describing the structure of queries to which they are willing to respond.

The query routing protocol of the distributed information discovery platform may also provide extensibility. In some embodiments, arbitrary schemas or queryspaces may be used on a distributed information discovery network. In such embodiments, there may be no need for centralized schema or queryspace management. Thus, ad hoc collaboration may be simplified.

The query routing protocol of the distributed information discovery platform may also provide scalability. For example, in one embodiment, a distributed information discovery network may support millions of publishers and consumers performing billions of transactions per day. In some embodiments, sophisticated implementations may take advantage of advanced connection-management features provided by lower-level protocols (e.g. HTTP/1.1).

Some embodiments of the distributed information discovery platform may be used for two complementary search types: wide and deep. The concept of the expanded web covers both wide search of distributed devices (e.g. PCs, handheld devices, PDAs, cell phones, etc.) and deep search of rich content sources such as web servers.

In one embodiment, the distributed information discovery platform may be used to provide "wide search" on the web. Within the context of wide search, the distributed information discovery platform may provide an efficient mechanism for distributing queries across a wide network of peers. The alternative to this is each peer sending its queries to all the peers it knows about, which becomes expensive and inefficient in terms of bandwidth usage and search speed. The other extreme of this fully distributed search would be to have a server peer which handled all queries for all peers in the network. This would be inefficient since the server peer would become bottlenecked by all the queries, and would be a single point of failure in the network. The compromise employed by the distributed information discovery platform is of a series of "hub" peers each of which handles the queries for a group of peers. Each hub peer may specialize in an attribute such as geography, peer content similarity or application. Hub peers may forward queries to other hub peers either if they cannot satisfy the query or if it is desirable to expand the search to the widest number of peers possible.

In one embodiment, the distributed information discovery platform may be used to provide "deep search" on the web. "Deep search" may find information embedded in large databases such as product databases (e.g. Amazon.com) or news article databases (e.g. CNN). In one embodiment, rather than crawling such databases, indexing and storing the data, the distributed information discovery platform may be used to determine which queries should be sent to such databases and direct these queries to the appropriate database provider(s). The database provider's own search capabilities may be employed to respond to the query through the distributed information discovery platform. Thus, the resulting search results may be more up-to-date and have wider coverage than a set of conventional crawler search engine results.

The ability to search recently updated information may make the distributed information discovery platform well suited for "deep search." Crawler based search engines may require three or more months to crawl and index the web. Given that the "deep web" may be at least 10 times larger than the crawlable web, the time to crawl and index such resources may be prohibitive given the frequency at which many of "deep web" resources update (e.g. every 30 days). Although targeted or restricted crawling of head-line or other meta data is possible, such targeted or restricted crawling may still be an inefficient method for many deep searches, due to the "access" issue.

Unlike static web pages, deep web resources do not typically have a "page of contents" or similar index. As an example, Amazon.com contains millions of product descriptions in its databases but does not have a set of pages listing all these descriptions. As a result, in order to crawl such a resource, it may be necessary to query the database repeatedly with every conceivable query term until all products were extracted. In addition, since many such pages are generated dynamically given information about the consumer or context of the query (e.g. time, purchasing behavior, location, etc.), a crawler approach may lead to distortion of such data. For such reasons, some database providers may be resistant to allowing other search engines query their databases remotely. Finally, in some situations, content may be inaccessible due to access privileges (e.g. a subscription site), or for security reasons (e.g. a secure content site). The distributed information discovery platform may leverage remote access or public search capabilities provided by information providers. Furthermore, under the distributed information discovery platform, a provider that wishes to restrict remote access may still allow searching and control how its content is searched by registering with a distributed information discovery network.

Conventional search mechanisms may be less efficient than desirable in regard to some types of providers. In addition, conventional search mechanisms typically give the content provider no control over the format of the data or the decision about which article to show in response to a query. In contrast, the distributed information discovery platform specifies a common query routing protocol which may give both parties more flexibility and control of the exchange of data, which may improve search efficiency in some embodiments.

FIG. 1 illustrates a network that utilizes the distributed information discovery platform according to one embodiment. The distributed information discovery platform may be applied to create a distributed information discovery network having three main types of participants. Information providers, or simply providers 120, may each register a description of itself on the distributed information discovery network, and then wait for requests matching information in the description. A provider 120 may be defined as anything that responds to requests (queries) in the network. A provider 120 may be, for example, a peer in a peer-to-peer network or a Web server such as cnn.com. In one embodiment, providers 120 may register by sending registration information to the hub. The registration information may include metadata describing the types of queries which the provider 120 may be able to respond to. In one embodiment, the registration information may be maintained in a registration repository that may include registration information for a plurality of providers 120.

Consumers 140 may query the network and wait for responses from providers 120. A consumer 120 may be defined as anything that makes requests in the network. A consumer 140 may be, for example, a peer in a peer-to-peer network or a web site with an HTTP client interface to the network. In one embodiment, a "search button+results" interface item or items may be added to web pages of web sites that may invoke the search capabilities provided by the distributed information discovery platform. A network routing system, referred to as a hub 100, may handle query and response routing in the network. A hub 100 may act as an access point that may provide virtual access to the entire distributed information discovery network. Hubs 100 may facilitate efficient query routing over the network by handling message routing between consumers 140 and providers 120. Providers 120 may register a description with the hub 100 and wait for matching requests. Consumers 140 may query the network through the hub 100 and await responses.

A consumer 140 may initiate a query in the network. In one embodiment, the query may be sent to a hub 100 nearest to the consumer 140. The hub 100 then determines one or more providers 120 of which the hub 100 is aware (e.g. that have registered with the hub 100) and that may be qualified to process the query. In one embodiment, a hub 100 may include a resolver 102 which may handle the determination of qualified providers 120. Metadata the hub 100 has on the providers 120, including the provider descriptions registered with the hub 100, may be used to determine the qualified provider(s) 120. The hub 100 then may send the query to the provider(s) 120 it has determined to be qualified. Each provider 120 that receives the query may process the received query and send one or more responses to the hub 100. The hub 100 may receive the responses and route them to the consumer 140 that initiated the query. In one embodiment, a hub 100 may include a router 104 that handles the routing of queries to providers 120 and the routing of responses to consumers 140. Thus, the distributed information discovery platform allows information providers 120 to publish a description of queries that they are willing to answer. Information consumers 140 can submit queries to the network, which routes each query to all interested providers 120.

In many applications, a program or node may act as both provider 120 and consumer 140. Physically, a provider 120 may be, for example, either an individual computer or a load-balanced set of computers; a consumer 140 may be, for example, an individual computer or a web service; and the network may encompass a cloud of machines. The term "computer" is not limited to any specific type of machine and may include mainframes, servers, desktop computers, laptop computers, hand-held devices, PDAs, telephone or mobile phones, pagers, set-top boxes, or any other type of processing or computing device. Providers 120 and consumers 140 may contact the network through a specific hub 100 implemented on one or more machines. A hub 100 may provide virtual access to the entire distributed information discovery network. In some embodiments, providers 120 and consumers 140 may contact different hubs 100.

In some embodiments, the distributed information discovery platform may provide the following functionality:

The query routing protocol: a protocol for defining queries, responses and registrations. The query routing protocol may allow both structured, lightweight and efficient query message exchange. In one embodiment, the query routing protocol may be implemented in XML.

Queryspaces: Since providers may have widely differing kinds of content or resources in their datastores, the query routing protocol may be used to define "queryspaces" that may be used to define the structure of queries and the associated registration information for a provider 120. In one embodiment, queryspaces may define the structure of a valid query that a provider 120 can process. In one embodiment, queryspaces may be implemented in XML.

Registration: providers 120 may register with a distributed information discovery network Registration information for a provider 120 may include queryspaces that define which queries the provider 120 may respond to. The registration, in one embodiment, may include an XML-based encoding of a logical statement characterized by a queryspace, optionally characterized by a schema. If no schema is specified a default schema for general keyword matching may be used, in one embodiment.

Query Formulation: users and end applications (consumers 140) may present queries to a distributed information discovery network as arbitrary XML, in one embodiment. Schema selection may be performed by HTTP header specification, in some embodiments. In one embodiment, queries presented by consumers 140 may adhere to specific queryspaces.

Query Resolution: queries are resolved by a resolver 102 in the network by matching query terms to registration terms. Providers 120 whose registration terms match the query terms are returned by the resolver 102.

Query Routing: queries are routed to the appropriate provider 120 by sending, for example, XML requests over HTTP. A router 104 sends the requests and awaits responses. In some embodiments, the router 104 may continually monitor providers to determine availability and reliability.

Provider Responses: providers 120 respond to queries in, e.g., arbitrary XML that may include links to any results they have in their site.

Presentation: In one embodiment, the distributed information discovery network may not perform any presentation of the responses from providers 120. In this embodiment, the consumer may perform such presentation, e.g. either as a web page or as a client side user interface. In one embodiment, the distributed information discovery network may collate results from providers 120, perform ranking on the results with respect to the query and present them in HTML, for example. Thus, a general application or user (consumer 120) may be able to query a distributed information discovery network and act on the responses as it sees fit—for example a music file sharing application may receive results and sort them according to file size/connection rate.

According to a distributed information discovery platform, providers may register descriptions of queries which they desire to have routed to them. These registrations may be meta-data indexes. A user may send a search query to a distributed information discovery routing system. The query may be compared to the registrations (e.g. meta-data indexes). In one embodiment, the registrations may be stored in XML format describing a conjunctive-normal logic. Queries are then routed to providers matching the query. In some embodiments, matches may be determined according to a user or pre-defined relevance.

Figure 2:
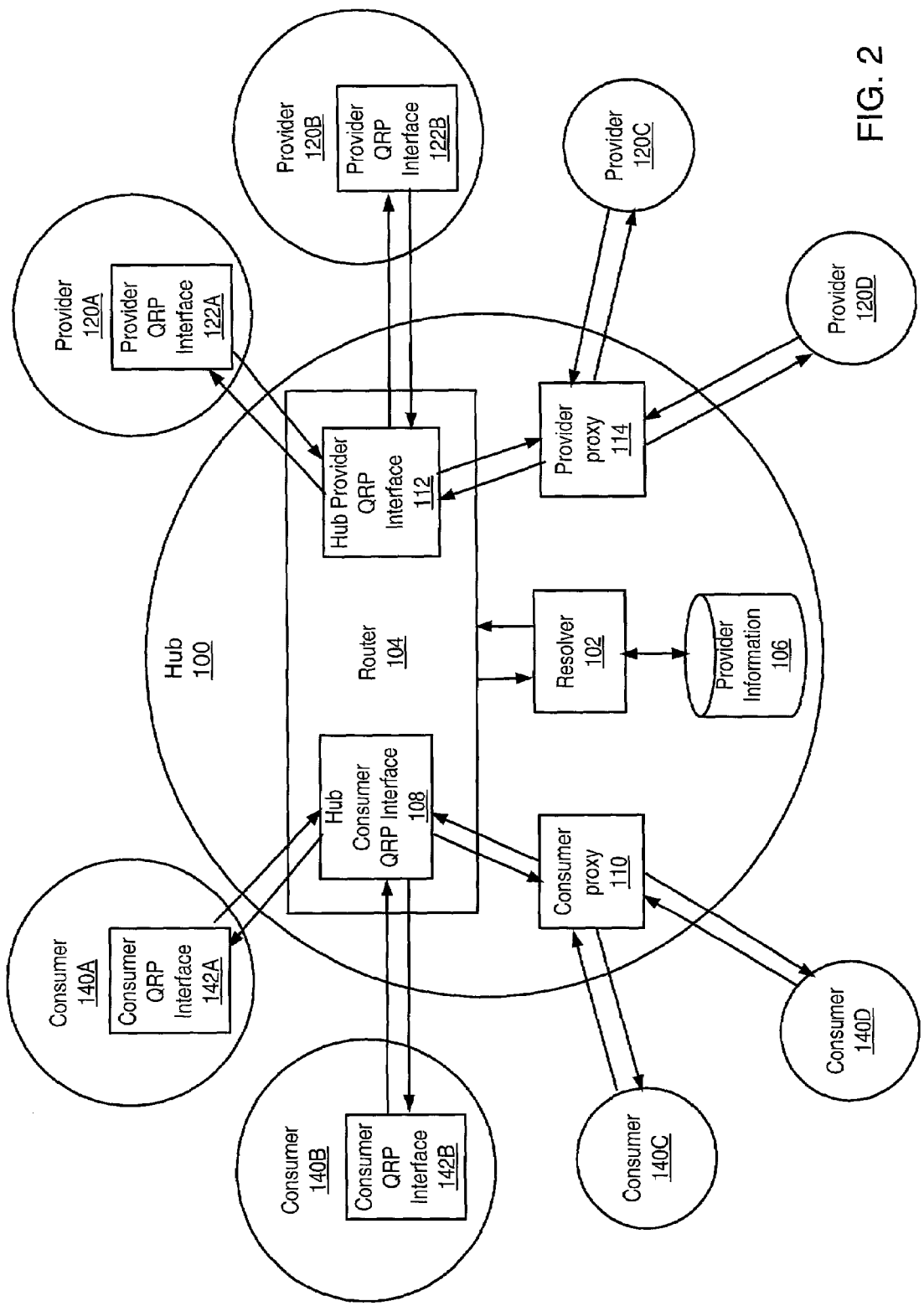
FIG. 2 illustrates an architecture for the distributed information discovery platform according to one embodiment.

An architecture for the distributed information discovery platform is shown in FIG. 2, according to one embodiment. In one embodiment, a consumer 140 may provide users an access point to a distributed information discovery network. A consumer such as consumer 140A may include a consumer query response protocol (QRP) interface 142. The consumer QRP interface 142 may send queries written in the query response protocol to the hub 100 for query resolution and routing. After sending a query, the consumer QRP interface 142 may await responses from providers. In one embodiment, the queries may be received by a hub consumer QRP interface 108 of router 104. In one embodiment, the consumer QRP interface 142 may also perform formatting of the responses for presentation to the end user or application. In one embodiment, consumers 140 may also include a user interface (e.g. a web user interface) to the hub (e.g. the router and/or resolver). In one embodiment, a consumer 140 may include a mechanism for ranking and presentation of query results. In one embodiment, this mechanism may be a component of the consumer QRP interface 142. Ranking methodology may be implicit in each queryspace, and may be returned as part of each response, in some embodiments. Some ranking schemes may require third-party involvement.

In one embodiment, consumers such as consumer 140C may not include a consumer QRP interface 142. These consumers may use a consumer proxy 110 to interface to the functionality of the hub 100. The consumer proxy 110 may perform translation of queries formatted in one or more query protocols supported by the consumers 140 into queries in the query routing protocol. These queries may then be sent to the hub 100 for resolution and routing. In one embodiment, the queries may be received by a hub consumer QRP interface 108 of router 104. The consumer proxy 110 may also perform translation of query responses formatted in the query routing protocol into one or more protocols supported by the consumers 140. As shown, one or more consumers 140 may interface with the consumer proxy 110.

In one embodiment, a provider such as provider 120A may include a provider query response protocol (QRP) interface 122 that may accept queries from the hub 100 in the query routing protocol and respond to the queries with query responses in the query routing protocol. The provider QRP interface 122 may perform translation of queries into provider-specific requests. In one embodiment, the provider QRP interface 122 may not perform any indexing or searching itself, but rather may call the appropriate indexing and/or searching interface of the provider 120, for example, a database search engine. In this embodiment, the provider QRP interface 122 may, if necessary, translate the queries from the query response protocol into a protocol that may be used by the appropriate indexing and/or searching interface of the provider 120. The provider QRP interface 122 may also, if necessary, translate the query responses from the protocol used by the appropriate indexing and/or searching interface of the provider 120 into the query response protocol. A provider QRP interface 122 may be, for example, a small modification of an existing search engine script (Java Server Page (JSP), Perl etc.) so that queries from a distributed information discovery network can be applied to the provider's search engine.

Provider proxy 114 may perform translation of queries formatted according to the query routing protocol to specific search engine formats for a provider 120 such as provider 120C. Provider proxy 114 may also perform translation of responses formatted according to the specific search engine formats into responses formatted according to the query routing protocol. A provider proxy 114 may be used, for example, if a provider 120 does not run its own provider QRP interface 122B but does allow access to its own search engine.

Hub 100 performs the routing of queries from consumers 140 to providers 120. The hub 100 accepts queries, resolves those queries to the appropriate providers 120 and then manages the routing of the queries to the providers 120. The hub 100 then may collate the results received from one or more providers 120 and send the results back to the requesting consumer 140 in a query response.

In one embodiment, rather than sending the results back to the consumer 140 in a query response, the results may be provided to the client by other means. For example, the query message may include an email address or addresses to receive the results. After receiving and collating the results, the hub 100 may email the results to the email address(es) specified in the query message. In one embodiment, the hub 100 may also receive queries in email messages from consumers. As another example, the hub 100 may post the results to a URL specified in the query message. Alternatively, the provider 120 may provide the results directly to the consumer 120 rather than routing the results through the hub 100. The query message may include information that allows the provider 120 to provide the results directly to the consumer 120. For example, the query message may include an email address and/or a URL for the consumer 140, and the provider 120 may email the results to the specified email address or send the results directly to the URL specified in the query message.

A hub 100 may comprise a router 104 that may provide a portion of the functionality of the hub 100. The router 104 may route queries to providers 120, manage query connections, collate results and return responses to consumers 140. A hub may also comprise a resolver 102 that matches queries to providers 120. Provider information 106 may include one or more registration files comprising metadata specified by the providers 120 during registration.

In one embodiment, the resolver 102 may be based on a full text search engine. For example, the core components may be adapted from the Lucene search engine (http://www.lucene.com). In one embodiment, the resolver 102 may index all tags and text in the registration files. A reverse index may be created which maps query term to provider. For efficiency, the resolver may create separate indices for each queryspace.

In one embodiment, a provider 120 may accept queries in the query routing protocol directly from consumers 140 without the queries being routed by the hub 100. In one embodiment, a provider 120 may also return responses to queries directly to consumers 140 without routing the responses through the hub 100.

In one embodiment, a distributed information discovery system may be implemented as a series of distinct web services. Each of the router, resolver, proxies, and QRP interfaces may run independently. In one embodiment, these web services may be implemented as Java Servlet classes referencing additional Java classes for core functions. For example, in a web embodiment, each of the router, resolver, proxies, and QRP interfaces may be implemented on a web-accessible server or servers. Also, a distributed information discovery network may include multiple different routers, resolvers, proxies, and QRP interfaces. One router or resolver may register with another router or resolver. Or one distributed information discovery system implementing a router, resolver, proxies, and/or QRP interfaces may register with another such system. For example, a distributed information discovery routing system may register providers of information concerning outdoor recreation. Another distributed information discovery routing system having provider registrations for boating may register with the first system.

In one embodiment, a database used by any of the above components may be a database that provides persistency, such as a GOODS database.

Using the proxies and QRP interfaces described above, the distributed information discovery platform may offer a unique technology by enabling search across heterogeneous communication protocols and systems and presenting those results using any other protocol and system. An example of this is the distributed information discovery platform's ability to search Java Server Page (JSP) based HTTP systems simultaneously with Perl-based XML systems and Java-based peer-to-peer protocol systems. The distributed information discovery platform may also provide a mechanism for presenting those results in HTTP-based HTML, a peer-to-peer protocol, or any other protocol/medium combination.

The consumer and provider proxies and interfaces may serve as adaptors for multiple data sources to plug into a standardized interface for distributed deep search. In one embodiment, the distributed information discovery platform is an XML-based request/response system. By using an XML-based messaging format, the distributed information discovery platform may enable powerful and easily implemented deep web searches. Participants in the distributed information discovery platform network need only apply fairly common and available facilities to adapt their system as a network provider. The XML nature of the response messages additionally expands the scope of a provider's ability. Applications other than web browsers may manipulate the responses for different purposes such as determining an average price or a current demand based upon availability.

To be a network provider, participants may include a provider QRP interface 122 that may be tailored for a provider's specific system. A provider QRP interface 122 may parse or translate a query routing protocol request from the distributed information discovery network, query a provider back end 180 to get appropriate data 182, and then generate a response and send it back to the distributed information discovery network according to the query routing protocol. In one embodiment, the distributed information discovery platform may provide one or more generic QRP interfaces that may be used as examples that illustrate how to use a specific language to accept requests and/or generate responses. The distributed information discovery platform may also provide one or more QRP interfaces that plug into existing, freely available systems.

In one embodiment, queryspaces may be defined within the distributed information discovery platform that enable providers 120 to do more than return links to web pages. For example, rather than querying a database, a QRP interface 122 may compute a price for a particular service based on demand in real time. The QRP interface 122 may generate data, or may cause another application to generate data on demand. An example may be an auction system for spare CPU cycles, where a client would query various providers 120 for CPU time. The providers 120 may generate a price based on current availability. In one embodiment, the distributed information discovery platform may include a result presentation mechanism that may perform computations on and/or presentation formatting of results data.

Figure 3:
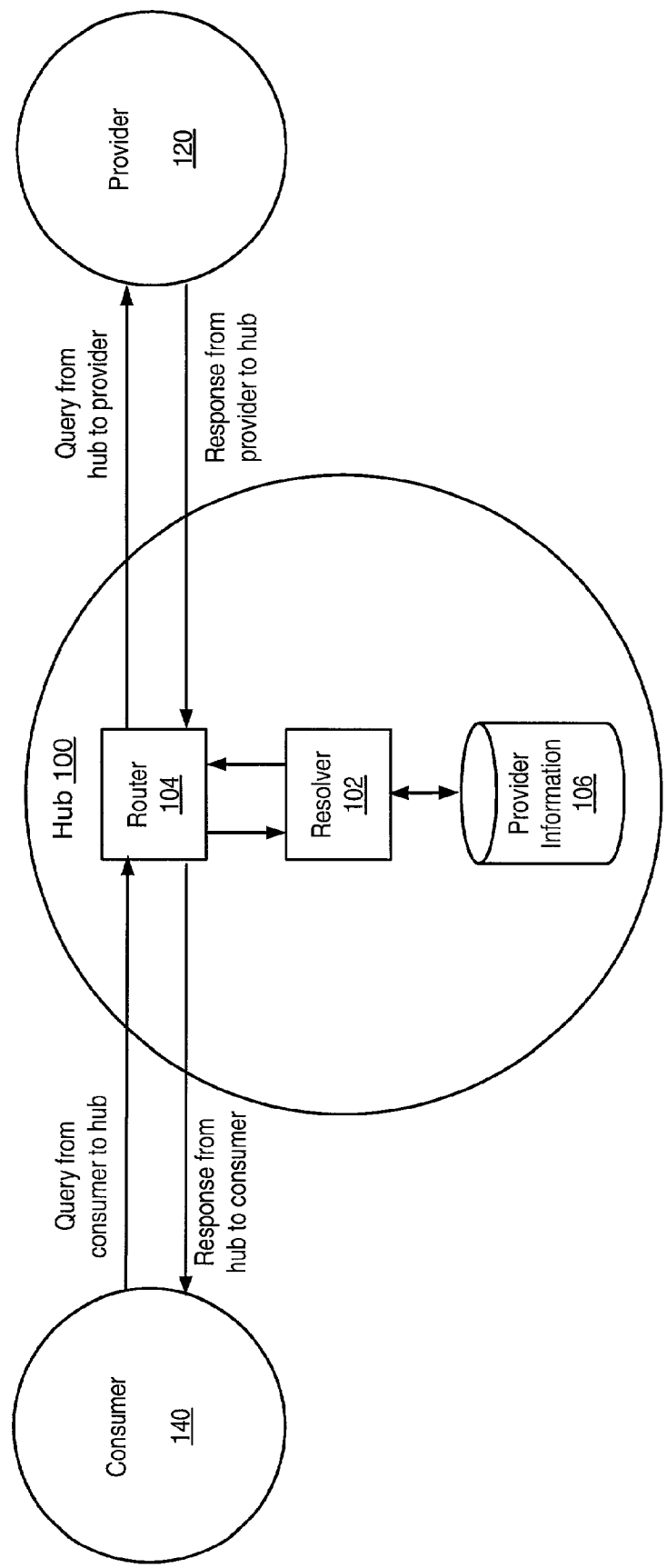
FIG. 3 illustrates message flow in a distributed information discovery network according to one embodiment.

FIG. 3 illustrates message flow in a distributed information discovery network according to one embodiment. An application on consumer 140 may find information providers 120 to respond to a particular query by sending the query into the network via a specific access point (hub 100). In one embodiment, consumer 140 may send the query to router 104 of hub 100. Router 104 may then send the query to resolver 102. In one embodiment, queries may conform to the query routing protocol. In one embodiment, queries are markup language (e.g. XML) messages with essentially arbitrary structure. In this embodiment, there are no restrictions on what tags may be used in queries.

Resolver 102 may determine one or more providers 120 which may receive the query. One or more information providers 120 may have previously registered with hub 100 by sending registration messages each including one or more queryspaces for the particular provider 120. In one embodiment, information from the registration messages, including queryspace information, may be maintained in provider information 106. Provider information 106 may be a file or database of files including registration information for one or more providers 120. Resolver 102 may index and search provider information 106 for queryspaces that match the query. For a provider 120 to be selected to receive the query, the queryspace specified in the query must match a queryspace of the provider 120. Also, the path predicate specified in the registration message must select a non-empty set of nodes in the query.

After determining the one or more providers 120 to receive the query, resolver 102 may provide a list of the selected one or more providers 120 to router 104. Router 104 may then send the query to each of the selected one or more providers 120. Once an information provider 120 receives the query, it composes a response and sends it back to the router 104 of hub 100. Hub 100 may receive one or more responses from each provider 120 that was sent the query. Router 104 may then forward the received responses to the consumer 140, and thus to the querying application. In one embodiment, the hub 100 does not evaluate competing relevance rankings; that task is left to the querying application.

In one embodiment, the hub 100 may collate the responses received from one or more providers 120 prior to sending them to the consumer 140. In this embodiment, consumers 120 are not required to listen for asynchronous responses. Collation may also provide security benefits. For example, collating responses may help to prevent distributed denial-of-service attacks based on spoofed queries. Also, the distributed information discovery network may be used to establish peer-to-peer connections.

In one embodiment, the consumer 140 may connect to the resolver 102 initially to request a set of providers 120 to be targets of a query, and then sends this list of providers 120 to the router 104, which manages the query routing from the consumer 140 to the providers 120, and which also returns the results to the consumer 140 (i.e. Consumer->Resolver->Consumer->Router->Providers->Router->Consumer).

Figure 4:
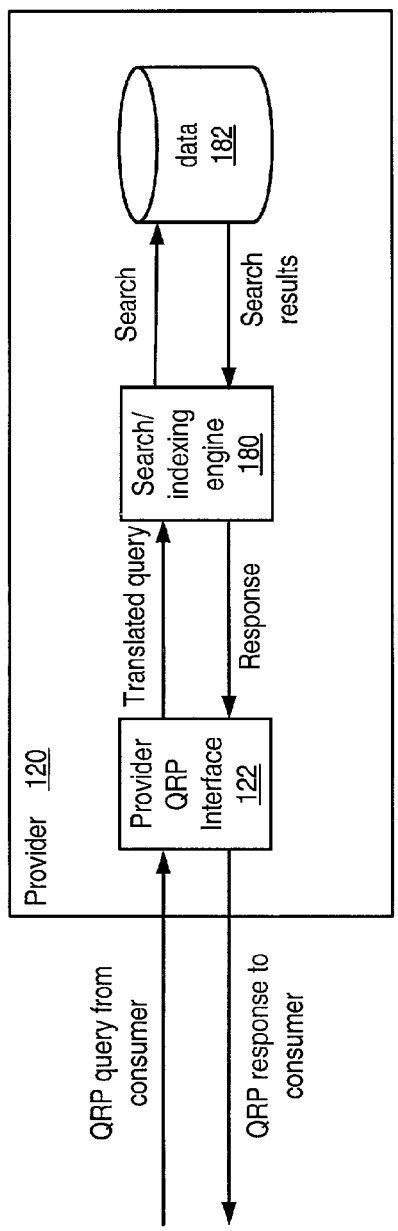
FIG. 4 illustrates a provider with a query routing protocol interface according to one embodiment.

FIG. 4 illustrates a provider 120 with provider QRP interface 122 interfacing to a provider search engine backend 180 according to one embodiment. In one embodiment, a provider QRP interface 122 may serve as an adaptor to the query routing protocol. An advantage of an embodiment using a common protocol based on a technology such as XML is that fairly common and available facilities may be used to create a provider QRP interface 122 to serve as an adaptor between a provider backend and the distributed information discovery network.

Thus, to be a network provider, participants may include a provider QRP interface 122. A provider QRP interface 122 may be tailored for a provider's specific system. A provider QRP interface 122 may parse or translate a query routing protocol request from the distributed information discovery network, query a provider back end 180 to get appropriate data 182, and then generate a response and send it back to the distributed information discovery network according to the query routing protocol. A provider QRP interface 122 may be a stand-alone application or alternatively a script capable of parsing the requests, gathering data and generating an appropriately formatted response.

In one embodiment, providers may send response messages to the provider QRP interface 122 using the Rich Site Summary (RSS) protocol as a default protocol. RSS is an XML protocol designed for site summaries. Using RSS may provide a common formatting standard of the responses, removing the need to handle custom HTML or other custom protocols being returned from providers.

In one embodiment, QRP interfaces may support queries wrapped as XML-RPC (XML Remote Procedure Call (RPC)) requests. XML-RPC is a protocol (which forms the basis of Simple Object Access Protocol (SOAP)) for invoking server side methods over XML.

Figure 5:
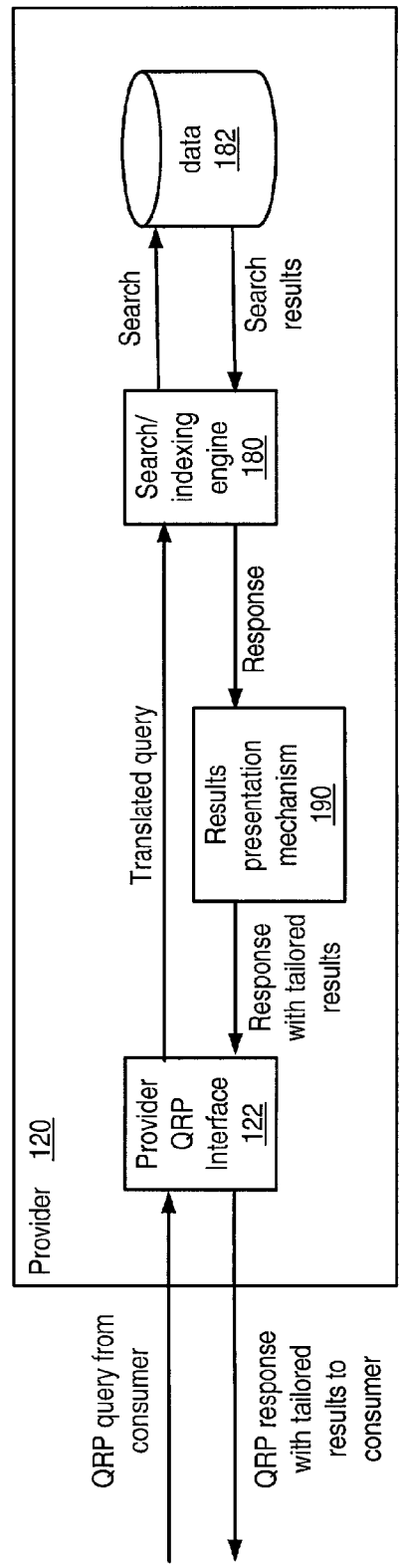
FIG. 5 illustrates a provider with a query routing protocol interface and a results presentation mechanism according to one embodiment.

FIG. 5 illustrates a provider 120 with provider QRP interface 122 interfacing to a provider search engine backend 180 according to one embodiment. In this embodiment, a result presentation mechanism 190 is shown that may enable providers 120 to do more than return links to web pages. For example, result presentation mechanism 190 may take the search results in the response message from search engine 180 and tailor the results into a presentation format such as a markup language document. This markup language document may be sent to the provider QRP interface 122, which may package the document in a QRP response and send it to the consumer 140. As another example, a result presentation mechanism 190 may compute a price for a particular service based on demand in real time. As an example, in an auction system for spare CPU cycles, a consumer 140 may query various providers 120 for CPU time. The providers 120 may generate a price based on current availability.

The distributed information discovery platform may be used for augmenting standard search engines that index statically available web pages. Standard web pages are useful mainly for web browsers. Other devices, such as wireless communications devices, may benefit from searches that expose relevant data. The distributed information discovery platform may provide the ability to collect queries and provide results with meaningful relevance to a wide variety of information consumers and producers. The distributed information discovery system may use a dynamic data collection methodology that is independent of an information provider's presence on the World Wide Web, for example. An information provider may use a provider QRP interface 122 to handle incoming queries, provide a registration that defines which services and information are available for what devices (e.g. cell phones, PDAs, etc.), and use a result presentation mechanism 190 to tailor results for presentation on the particular devices. For example, a cell phone may be used to find open service stations and compare prices, or restaurants to compare menus.

For providers 140 that do not run an adapter for the distributed information discovery platform, a hub 100 may run a provider proxy 114 as illustrated in FIG. 2. A provider proxy 114 may perform translation of queries formatted according to the query routing protocol to specific search engine formats for a provider 120. Provider proxy 114 may also perform translation of responses formatted according to the specific search engine formats into responses formatted according to the query routing protocol. In one embodiment, the provider proxy 114 may perform off-line spidering and indexing of the providers 140 and respond to queries as a standard search engine would (this could be considered an open search indexing service). In another embodiment, the provider proxy 114 may perform translation of queries formatted according to the query routing protocol to specific search engine formats for a provider 120, and may also perform translation of responses formatted according to the specific search engine formats into responses formatted according to the query routing protocol.

Figure 6:
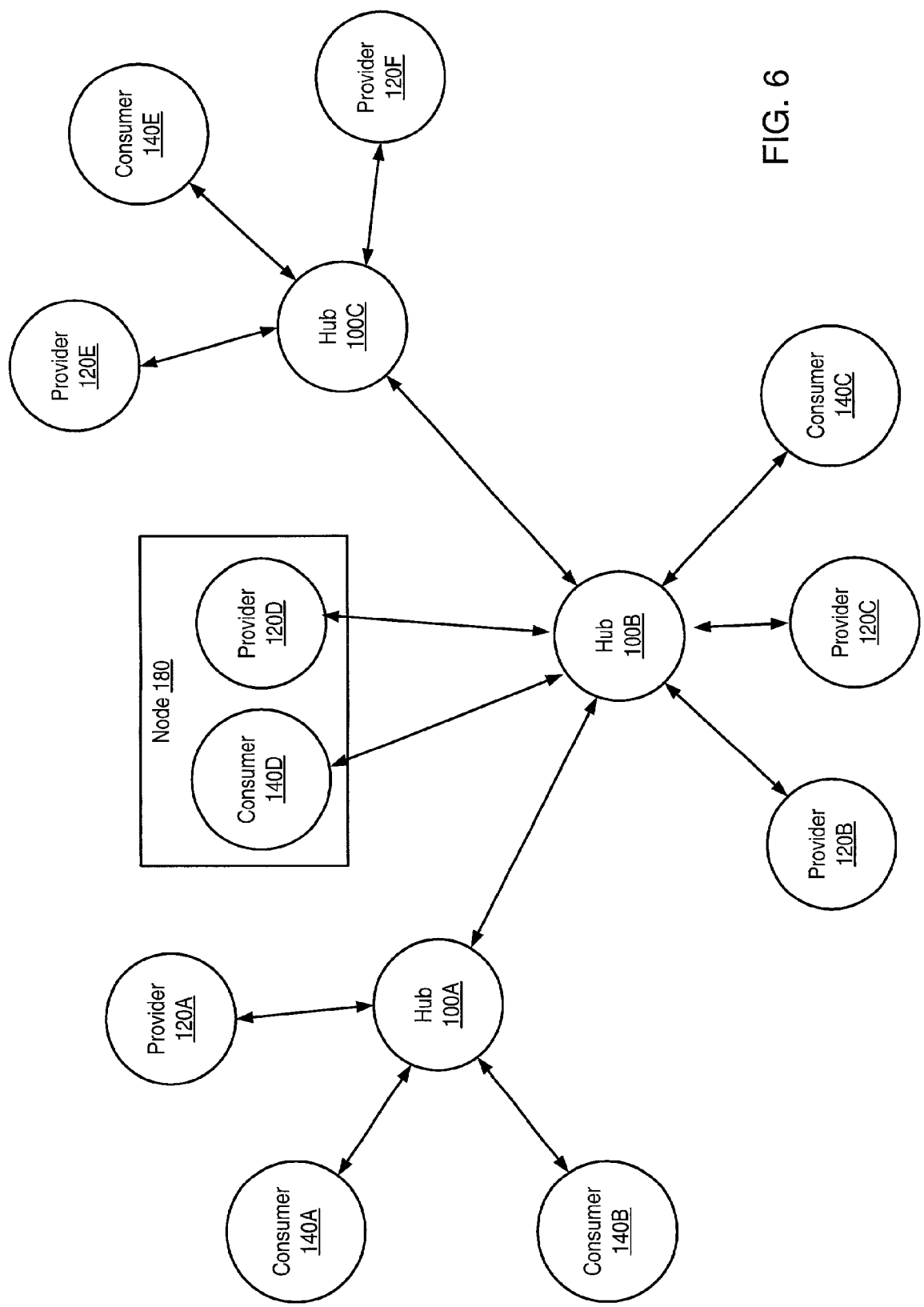
FIG. 6 illustrates an exemplary distributed information discovery network including a plurality of hubs according to one embodiment.

FIG. 6 illustrates an exemplary distributed information discovery network including a plurality of hubs 100 according to one embodiment. Each hub 100 may support one or more providers 120 and/or consumers 140 which may use the hub 100 as an access point to the distributed information discovery network. As shown in node 180, a node on the network may include instances of both a consumer 140 and a provider 120. In one embodiment, the distributed information discovery platform may support nodes comprising one or consumers 140, one or more providers 140, and/or one or more hubs 100.

In one embodiment, the distributed information discovery network may include one or more hubs 100 that each may support a particular type of application or specialist domain. For example, a web site might run a hub 100 as a vertical aggregator of content pertaining to Java programming. Its providers 120 may include other sites with content focused on Java. However, the web site may also send queries out to a different hub 100 running on a more general technology news site whose providers 120 may include sites such as CNet or Slashdot. As another example, in a peer-to-peer network, hubs 100 may be used to group together peers with similar content, geography or queryspaces. Each peer within the network may interact with the hubs 100 using its appropriate service(s) (e.g. provider, consumer, and/or registration services).

Figure 7:
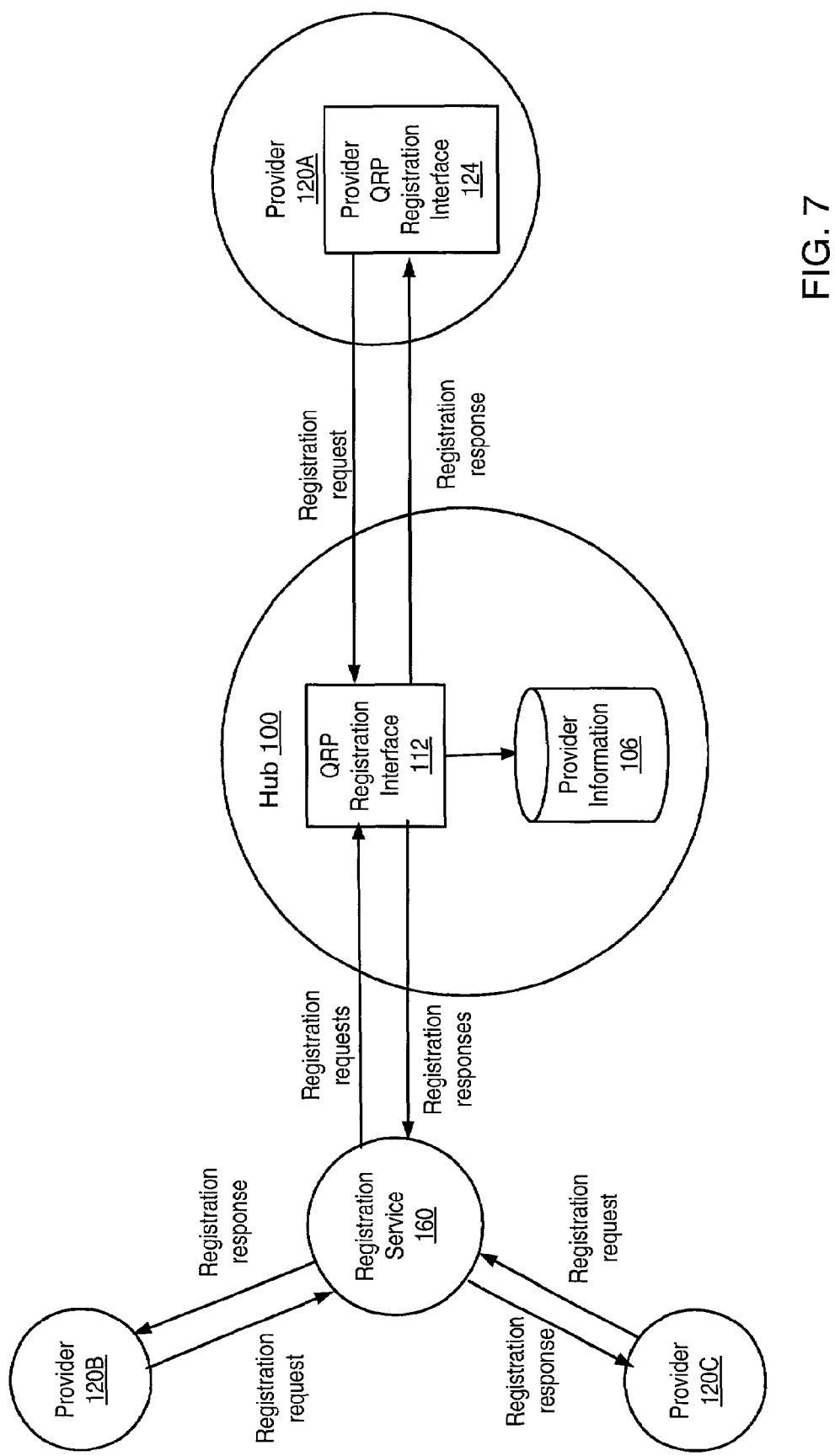
FIG. 7 illustrates provider registration in a distributed information discovery network according to one embodiment.

FIG. 7 illustrates provider registration in a distributed information discovery network according to one embodiment. Information providers 120 may register themselves within a distributed information discovery network. To register, a provider 120 may contact a hub 100 with a registration message. The registration message may conform to the query routing protocol (QRP). In one embodiment, a provider 120A may include a provider QRP registration interface 124 that is operable to send a registration message to the hub 100. In one embodiment, hub 100 may include a QRP registration interface 112 that may be configured to receive registration messages from providers 120. Provider QRP registration interface 124 may also maintain a registration file for the provider 120A. In one embodiment, the distributed information discovery platform may include a registration service 160 that may provide a QRP registration interface to hub 100 for providers 120 that do not include a provider QRP registration interface 124.

Providers 120 may specify the type of queries they wish to receive in a registration file that may be provided to a hub 100 at provider registration. In one embodiment, a registration file may be an XML document comprising metadata about the information that the provider 120 wishes to expose. This file may encode the type and structure of queries, queryspaces and response formats the provider 120 is interested in receiving. This file can be thought of as an advertisement of the provider's metadata and its structure. The registration file may specify:

The provider's query server endpoint—If this is a peer-to-peer network implemented using the peer-to-peer platform described herein, the endpoint may be a pipe identifier. In the web domain, this may be a CGI script which is capable of processing the query response protocol request messages and responding with a query response protocol response. Otherwise, the endpoint may be a URL. Queries which match one of the provider's predicates may be posted to this endpoint.

The queryspace of the queries this provider will accept. In one embodiment, this may be specified as a queryspace URI (e.g. URL). When queries are posted to this queryspace, the query may be checked against the provider's predicates for matches.

The response format that the provider is capable of responding in. The response format may be specified as a URI to an XML schema.

The structure and content of the queries the provider is interested in receiving, specified in predicate form. In one embodiment, a set of predicates may define the structure and content.

In one embodiment, a registration message may include the following tags:

| | |
|---|---|
| <register> . . . </register> | - tags identifying this as a registration document |
| <predicate> . . . </predicate> | - tags enveloping a predicate |

The following is an example registration document according to one embodiment:

```
<register>
    <queryspace>http://www.abcd.com/opensearch</queryspace>
    <query-server>http://www.efgh.com/search.jsp</query-server>
    <predicate>baba ghannouj ghannoush ganoush</predicate>
</register>
```

This example registers a provider 120 with a queryspace. It also registers one predicate that will direct any query containing any of the words "baba", "ghannouj", "ghannoush" or "ganoush" to the provider's query server running at http://www.efgh.com/search.jsp. This matches any query containing the particular keywords.

As another example, consider the following registration:

```
<?xml version='1.0'?>
<register xmlns="http://abcd.org/search"
    xmlns:b="http://bigbookseller.com/search"
    query-space="http://bigbookseller.com/search"
    query-server=http://littlebookseller.com/exec/search>
    <predicate>
        <query>
            <b:author>
                John Doe   Jane Doe
            </b:author>
            <b:title>
                Foobar Gadgets Widgets
            </b:title>
        </query>
    </predicate>
</register>
```

This registers a provider 120 with the text queryspace, specified by http://bigbookseller.com/search. This registration registers the provider for the following queries:

any query containing "John Doe" or "Jane Doe" in the <author> field;

any query containing "Foobar", "Gadgets", or "Widgets" in the <title> field.

Queries matching these conditions may be directed to the query server running at http://littlebookseller.com/exec/search. Predicates may be much larger than this exemplary predicate, and may also contain more complex structure.

In some embodiments, if the provider 120 does not specify a queryspace, a default queryspace may be registered for the provider 120. In such an embodiment, queries failing to indicate a queryspace may be assumed to be of the default queryspace.

In one embodiment, a provider may be registered using a user interface in which keywords may be typed or pasted. In one embodiment, the user interface may be a Web page. In one embodiment, providers may be able to choose from a list of categories in addition to choosing keywords for their registrations. These categories may reflect the contents of open directories such as dmoz.org and some common news sources (e.g. CNN). For example, the top level of dmoz may be used as a pull down list or menu of categories from which providers may choose. In one embodiment, further specialization in categories may be provided—e.g. for News, providers may choose News->Tech News. In one embodiment, a recursive menu system may be used—e.g. a provider picks News, then presses submit, then picks Tech News and so on. The category data may be updated as needed—e.g. daily for news, weekly for other categories.

In one embodiment, providers may edit their registration information via a user interface (e.g. web page) or a web form, or alternatively submit a replacement/addition to their registration. In one embodiment, a user interface may be provided through which providers may view the results of searches and hits performed by consumers—e.g. how many searches resulted in their entry being returned, how many users clicked through, etc. In one embodiment, a user interface may be provided through which providers may monitor and/or control the number of queries sent to them and also to throttle traffic (e.g. turn it off) if necessary.

One embodiment may include a site analysis tool that may be used for building registrations for sites that do not know how to or that do not desire to build their own registration. The site analysis tool may be available as an option during registration (for example, "build me a registration file" with a turn around of 24 hours or so), and may allow the provider to enter one or more initial keyword starting points.

Figure 8:
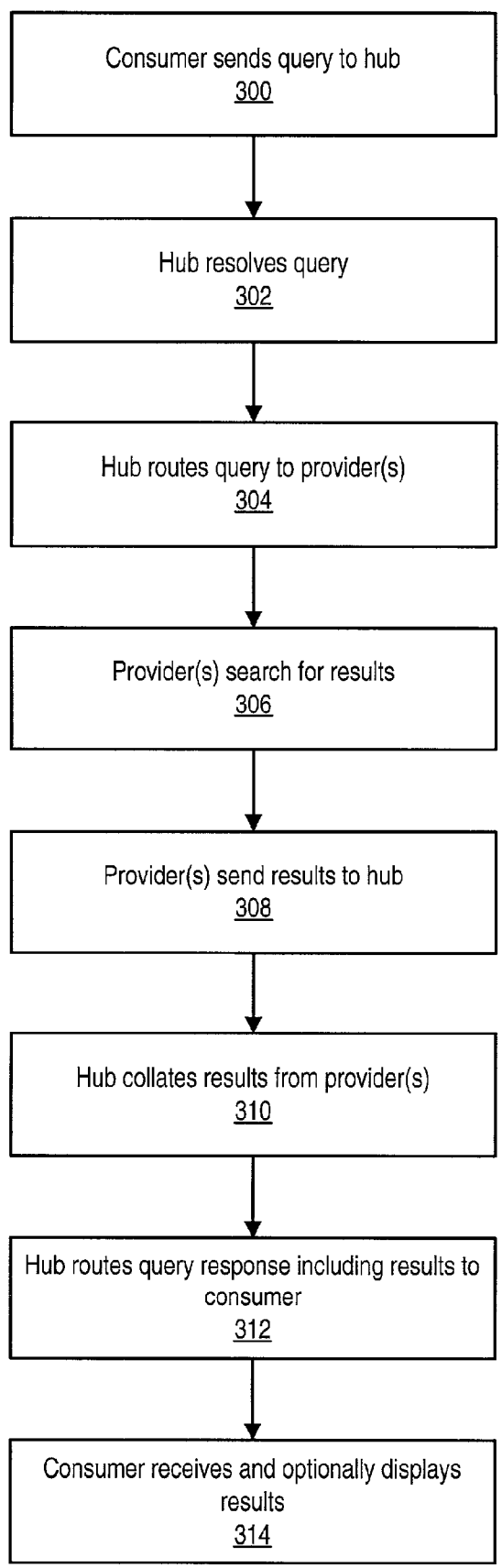
FIG. 8 is a flowchart illustrating message flow in a distributed information discovery network according to one embodiment.

FIG. 8 is a flowchart illustrating message flow in a distributed information discovery network according to one embodiment. An application on a consumer may find information providers to respond to a particular query by sending the query into the network via a specific hub. In one embodiment, queries may conform to a query routing protocol. In one embodiment, queries are markup language (e.g. XML) messages with essentially arbitrary structure. In this embodiment, there are no restrictions on what tags may be used in queries.

The consumer may send the query to the hub as indicated at 300. In one embodiment, a router on the hub may receive the query. In one embodiment, a query routing protocol interface of the consumer may translate the query from a protocol understood by the consumer to the query routing protocol before sending the query to the hub. As indicated at 302, the hub may resolve the query to determine one or more providers that may want to process the query. In one embodiment, the router may then send the query to a resolver on the hub to perform the query resolution. For a provider to be selected to receive the query, the queryspace specified in the query must match a queryspace of the provider. Also, the path predicate specified in the registration message must select a non-empty set of nodes in the query. In one embodiment, the resolver may index and search provider information for queryspaces that match the query.

After determining the one or more providers to receive the query, the hub may route the query to the one or more providers as indicated at 304. In one embodiment, the resolver may provide a list of the selected one or more providers to the router. The router may then send the query to each of the selected one or more providers. Once a provider receives the query, it may search for results in its queryspace that satisfy the query as indicated at 306. A backend search engine of the provider may perform the search. In one embodiment, the query may be translated from the query routing protocol to a protocol used by the provider by a query routing protocol interface of the provider. The provider may compose a response (containing the results of the query) and send it back to the hub as indicated at 308. In one embodiment, the query may be translated from the protocol used by the provider to the query routing protocol by a query routing protocol interface of the provider before sending the response to the hub. In one embodiment, the response may be received on the hub by the router. The hub may receive one or more responses from each provider that was sent the query at 304. As indicated at 310, in one embodiment, the hub may collate the responses received from the one or more providers prior to sending them to the consumer. The hub may then forward the (possibly collated) responses to the consumer as indicated at 312, and thus to the querying application. In one embodiment, the router handles the routing of the response(s) to the consumer. The consumer may receive the query response and optionally display the results as indicated at 314. Optionally, the consumer can do whatever is necessary to the results, including storing the results, forwarding the results, and modifying the results. In one embodiment, the query routing protocol interface of the consumer may translate the query response from the query routing protocol to the protocol understood by the consumer after receiving the response from the hub.

In one embodiment, instead of, or optionally as well as, sending the results to the hub, the provider may send the results directly to a location specified in the query message. For example, the query message may specify a URL that the consumer wishes the results forwarded to or displayed at. As another example, the query message may include an email address or addresses that the consumer wants the results emailed to.

In some embodiments, pre-crawling may be employed to create or update a provider registration automatically. For example, a provider may register with a distributed information discovery network. The provider may use, or contracts a service to use, a tool to build a statistical metadata index from documents retrieved automatically through the provider's web-based interface. The metadata index may then be used to provide query routing. In other words, the provider's site may be "crawled" to create the registration (e.g. an XML-based metadata index). Key terms may be selected as the site is crawled to form the registration index.

A queryspace is a unique identifier for an abstract space over which a query will travel. Queryspaces may be identified by unique URIs. Queryspace URIs may not necessarily reference actual content. Queryspace URIs are identifiers that providers and consumers may use to find each other. In one embodiment, both providers and queries may have queryspaces. A provider's queryspace may be defined as a schema that defines the scope of the set of data which the provider is capable of searching. A query's queryspace may be defined as a schema that defines the scope of the set of data which the consumer wishes to search.

In one embodiment, the distributed information discovery platform may not make assumptions about the syntax or semantics of queryspaces. In this embodiment, the distributed information discovery platform does not process queryspaces, nor does it attempt to validate queries and responses—queryspaces are purely for coordination between consumers and providers. In one embodiment, a queryspace may include, but is not limited to, the following information:

Structure. Queryspaces may allow providers and consumers to agree on the structure of messages. A queryspace may specify structural constraints in a standard form, e.g. a DTD or an XML Schema.

Semantics. Providers and consumers may agree on the meaning of the messages that they exchange (in addition to their structure). While structural information may be machine-readable, semantic information may be intended for use by in writing client and server software.

Ranking. Queryspaces may define how clients may sort the results that they receive. Typically, ranking is application-dependent, and some applications may not require ranking at all.

In one embodiment, the distributed information discovery platform may not specify methods for exchanging queryspace information. The distributed information discovery platform ensures that providers receive only queries that match their queryspaces. The distributed information discovery platform encourages efficiency by allowing providers to filter the queries that they receive. To filter queries, a provider may include one or more predicates with each queryspace that they register. A predicate may be applied to each candidate query in the given queryspace; only queries that match the query may be sent to the provider. Internally, the distributed information discovery platform may use the predicates to optimize routing.

In one embodiment, each query may contain at least one query section which may contain arbitrary XML. The contained XML should conform to the specified queryspace; otherwise, the query will probably not match any information provider predicates and will therefore receive no responses. In some embodiments, the distributed information discovery platform may not attempt to validate the query. If multiple query sections are specified, the information provider may choose which query to respond to.

In one embodiment, the query routing protocol does not require queries or responses to identify machine addresses. Some queryspaces may agree to share addresses explicitly (e.g. peer-to-peer file sharing), while other queryspaces may choose to share addresses implicitly (e.g. with embedded XHTML). The structure of both the query and the response may be specified (explicitly or implicitly) by the chosen queryspace. In an example of a full-text schema, the response in the data section may be mixed-content XHTML to be displayed in a browser. In an example of a music schema, the data section may contain structured information intended for applications as well as "unstructured" XHTML intended for humans.

Some embodiments may use full-text queryspaces. In one embodiment, a full-text queryspace may use the following DTD:

```
<!DOCTYPE query [
    <!ELEMENT query -- (text?)>
    <!ELEMENT text -- (#PCDATA)>
]>
```

For example, a query for "dog biscuits" under this queryspace may be formatted as:

```
<query>
    <text>dog biscuits</text>
</query>
```

In one embodiment, a full-text queryspace may be the default queryspace. In some embodiments, a full-text queryspace, such as the above example, may be extended to support "and" and "or" operations.

Providers may register query predicates with a distributed information discovery network, e.g. by registering with a hub. When a client submits a query to the network, it is resolved to matching providers. For example, a provider may register a registration using the queryspace specified by the URI "http://www.infrasearch.com/food/recipies":

```
<register>
    <queryspace>http://www.abcd.com/food/recipes</queryspace>
    <query-server>http://www.efgh.com/search.jsp</query-server>
    <predicate>baba ghannouj ghannoush ganoush</predicate>
    <predicate>
        <and>
            <type>appetizer</type>
            <ingredients>eggplant tahini</ingredients>
        </and>
    </predicate>
</register>
```

This registration registers the provider with the recipes queryspace with two predicates. Queries with "appetizer" in their <type> node and either of the words "eggplant" or "tahini" in their <ingredients> node are matched by this registration. A predicate is also registered that will direct any query containing any of the words "baba", "ghannouj", "ghannoush" or "ganoush" to the provider's query server running at http://www.efgh.com/searchjsp.

Query Node Patterns (QNPs) may be the basic building block of query predicates. Each matches a node of an XML query. QNPs may be XML fragments. They match a query when they match some subset of that query's structure, or, more formally, they may be constructed by a series of the following transformations: (1) deleting a node in the query; or (2) replacing the query with a subnode of itself.

For example, consider the following XML query:

```
<request>
    <object type=file>
        <format>mp3</format>
        <artist>U2 Nirvana</artist>
    </object>
</request>
```

This query is matched by the following QNPs shown in the following table:

TABLE 1

| QNP | Matches queries with: |
|---|---|
| <object></object> | an OBJECT node |
| <object type=file></object> | an OBJECT node with parameter TYPE=file |

TABLE 1-continued

| QNP | Matches queries with: |
|---|---|
| <format>mp3</format> | a FORMAT node with mp3 in its text |
| <object><br><format></format><br></object> | an OBJECT node containing<br>a FORMAT node |
| <object><br><artist>U2 Nirvana</artist><br></object> | an OBJECT node containing an ARTIST node with "U2" or "Nirvana" |

In QNP matching, tag text (a.k.a. character data) may be tokenized at whitespace breaks and considered a set of tokens. Some embodiments may be limited to keyword matching only. Other embodiments may support phrase matching as well. In some embodiments, matching may be case-insensitive.

In some embodiments, a QNP may only contain one path through the query XML. In such embodiments, the following QNP would be invalid:

```
<object>
    <format>mp3</format>
    <artist>U2</artist>
</object>
```

In other embodiments, the single path restriction does not apply and the above QNP would be valid. In single path restricted embodiments, the above QNP would instead be specified as a predicate containing the conjunction of two separate QNPs:

```
<and>
    <object>
        <format>mp3</format>
    </object>
    <object>
        <artist>U2</artist>
    </object>
</and>
```

Tag text may be an exception to the single path restriction. In some embodiments, if a QNP node contains multiple text tokens, these may form an implicit disjunction.

A query predicate may be a boolean expression composed of QNPs. In some embodiments, predicates must be in conjunctive normal form, i.e., a conjunction of disjunctions. In other embodiments, this restriction may not apply.

As an example of a conjunctive normal form predicate, consider the following query predicate:

```
<predicate>
    <and>
        <object type=file>
        <object><format>mp3</format></object>
        <or>
            <artist>U2</artist>
            <artist>Nirvana</artist>
        </or>
    </and>
</predicate>
```

Note that the first two conjuncts are implicit disjunctions. When an <or> . . . </or> tag contains only a single QNP, the <or> . . . </or> may be dropped. Similarly, if the top-level only has one element, the <and> . . . <and> may also be dropped. Thus, according to one embodiment, at its simplest, a predicate may be of the form:

<predicate>U2 Nirvana</predicate>

This predicate would match any query containing the word "U2" or the word "Nirvana."

As mentioned previously, a resolver may create and maintain a set of indices for the provider registration files, with separate indexes for each queryspace. When a provider sends a registration file, the resolver parses it into a set of predicates, each predicate having a set of clauses, and each clause having a set of disjunctions. In one embodiment, predicates may be in conjunctive normal form. Each predicate may be given a global unique predicate ID, and each clause may be given a local clause ID. For each pattern in the registration, a posting may be created which contains the predicate ID and the clause ID. The predicate ID and clause ID may be used to trace the pattern to the clause in the registration where the pattern occurs. The (pattern, posting) pair may be stored in the corresponding query space index. The posting may also include a score, which may be updated based on feedback received from the user. The following is an example of a simple XML fragment of two predicates from a registration and the corresponding index entries:

```
<predicate>
    <and>
        <object type=music>
        <object><format>mp3</format></object>
        <or>
            <artist>U2</artist>
            <artist>Nirvana</artist>
        </or>
    </and>
</predicate>
<predicate>
    <and>
        <object type=movies>
        <object><format>mpeg</format></object>
        <or>
            <title><quote>Little Mermaid</quote></title>
            <title><quote>Snow White</quote></title>
        </or>
    </and>
</predicate>
```

The corresponding entries in the index may be:

| | |
|---|---|
| object&type=music | (predicate0, clause0) |
| object>format>mp3 | (predicate0, clause1) |
| artist>U2 | (predicate0, clause2) |
| artist>Nirvana | (predicate0, clause2) |
| object&type=movies | (predicate1, clause0) |
| object>format>mpeg | (predicate1, clause1) |
| title>Little Mermaid | (predicate1, clause2) |
| title>Snow White | (predicate1, clause2). |

That is, the index will have eight entries. In one embodiment, at least three of these entries have to match a query for the query to be routed to the provider.

Query resolution is the process of determining a set of one or more providers to which a given query should be routed. Sending all queries to all providers is inefficient, therefore the distributed information discovery platform defines a framework for providers to register the type of queries they are interested in receiving and provides a query resolution and routing service. Providers may specify the type of queries they wish to receive in their registration file.

In one embodiment, the minimal condition for matching a query to a provider is that the query has to have the same queryspace as the provider registration. In one embodiment, the set of providers may be selected by the resolver 102 in the following order:

Providers which have all clauses of at least one predicate satisfied. In order to match a predicate, a query may first be tokenized into a set of patterns (QNPs). In one embodiment, providers may be ranked based on the matched pattern scores.

Providers which do not have a matching predicate, but are similar in their responses and have the same queryspace as providers who have a matching predicate.

If the number of providers returned is still less than the maximum, a provider may be selected (e.g. at random) from the same queryspace as the query. This allows the exploration of the provider content in case the provider registration file is incomplete, or is not updated frequently.

As mentioned previously, there may be a score associated with each (pattern, posting) pair in the resolver index. In one embodiment, scoring may be used to determine the popularity of providers for a particular type of query. Scoring may be used in selecting the most popular providers relevant to the query first. Scoring works as follows. If a user sends some feedback in response to a query response, the (pattern, posting) pairs that matched the query may be retrieved from the corresponding queryspace index, and their scores updated (i.e. increased for a positive feedback or decreased for a negative one). In one embodiment, a simple score update formula may be used:

$$Score(t+1)=(alpha)*Score(t)+(1-alpha)*Feedback$$

where (0<alpha<1) determines the rate of change of the score. Other embodiments may use other score update formulas.

In one embodiment, in instances where there are very few providers who match a query, providers may be selected that did not match the query, but who have registered the same query space and who are similar to a provider who matched the query. In one embodiment, a method similar to collaborative filtering may be used in determining provider similarity. Providers who tend to match the same queries are considered more similar. In one embodiment, a similarity matrix may be maintained in the resolver. The entries in this matrix may determine the degree of similarity between provider x and provider y.

A router may perform the following functions:
receives the queries from the end application/consumer
routes the queries to the appropriate providers
merges the results of the queries and presents them to the end application When the router receives a request from the network, it may ask the resolver for a list of nodes on the network that are registered as wanting to receive queries like this one. Once the resolver returns a set of network node endpoints, the router routes the query to this set of providers. In one embodiment, the resolver may return network node IDs with the network node endpoints that may be relevant only within the distributed information discovery platform and that may be used for logging.

In one embodiment, a router may be a JAVA Servlet. The router may be platform-independent so that the deployment platform for the router may be Linux, Win32, etc. In some embodiments, routers may be distributed or clustered.

In one embodiment, a router system may be organized as follows:
Router: performs the functions listed above
RouterServlet: receives routing requests and gives access to real-time statistics
HttpRouteConnection: uses HTTP as transport and XML as encoding for a route to a given provider
Router.Stat: provides statistics for a given route The RouterServlet may receive a request to route a particular query. In one embodiment, each routing request may be an HTTP request with the following headers:
Uuid: the unique identifier of this request (may be used for logging purposes in the router, and may have other uses in other components or users of a distributed information discovery network).
Timeout: the amount of time to give each provider to respond.
NumHits: in one embodiment, each provider may respond with several hits, but the router may take only the first N hits to be propagated back to the app/user.
FlushAfter: may indicate to flush the response stream after receiving responses from N providers.

In one embodiment, the body of the routing request may be an XML-encoded query (see description of queries above). In some embodiments, the routing request may also include a set of cookie headers, which may be encoded, for example, as "Set-Cookie:unique_provider_id=base64encoded_real_cookie".

When RouterServlet receives a query request from the distributed information discovery network, it asks the resolver for a list of nodes on the network that are registered as wanting to receive queries like this one. The resolver may return a set of network node URLs and network node IDs (e.g. unique provider IDs stored within the distributed information discovery router system and used for logging). The Router may then route the query to this set of providers.

The router may contact the list of providers returned by the resolver. Any transport and encoding may be used. In one embodiment, different transports and encodings may be plugged in. In one embodiment, HTTP and light-weight XML encoding may be used.

In one embodiment, the router may use an exponential back-off algorithm to handle spamming and/or slow or temporarily down hosts. For example, if a provider exceeds a set timeout, the resolver subsystem may be alerted to make the provider no longer active in the subsystem. If a time-out is exceeded, or exceeded too often, the provider may be unregistered or flagged so that further resolutions do not include this provider.

In some embodiments, in addition to collating the responses from the providers, the router may also pass through HTTP cookies (cookies may be retrieved from and set on a URLConnection class via a get/setHeader method, so this may be transport-independent, since other network-transport implementations of the URLConnection interface may be used). When passing a cookie from a provider to the client, the router may encode them as "unique_provider_id=base64encoding_of_real_cookie", for example, so that it may later match cookies with provider IDs when the user does another search.

In one embodiment, the Router may receive a query in XML format through a HTTP interface. When the Router receives the query, it may sends the query to the Resolver through an HTTP Interface. The Resolver may return with a list of providers that have registered interest in this query. In one embodiment, the Router does not attempt to interpret the query at all. The Router may then set up multiple threads, each thread opening a URL to post the query to each of the provider. In one embodiment, the query may be posted to each provider with a timeout value. When the provider returns with a result page (e.g. in XML), the router may parse the result page and extract the "hits" to be merged with the other hits from the other providers. The number of hits, the timeout value and the number of provider results may be specified through a "preference" interface.

In one embodiment, the router may maintain a pool of TCP/IP connections to the providers and reuse them. This reuse may reduce the overhead in opening and closing connections. For example, each HTTP request to the providers may use KEEP_ALIVE so that the connections will not be closed by the provider.

In one embodiment, the router system may track certain statistics so that administrators may access the router system to view current statistics about their node, such as how many queries were sent to them today, what's the average response time, how many queries failed, etc.

A provider may be registered with multiple distributed information discovery routers. In such embodiments, real-time stats may be aggregated at the time of viewing by code in the provider subsystem. This code may query each router to give up-to-the-moment stats for a given provider. The resulting information is processed and displayed.

In some embodiments, a distributed information discovery router may store and allow administrators to view historical data about their nodes. In an embodiment, each router system may keep a local log of its actions and export the log for download via HTTP with authentication protection. In one embodiment, logs may be periodically aggregated to a log-administrator machine with the script. Once aggregated from all the router systems, the logs may then be parsed. The result of the parsing may be a set of logs per provider.

In one embodiment, each parsed set of logs may include a:
  log file that includes information the router noted down for that provider's ID (e.g., provider-id.log)
  the successful routes of requests for that provider (e.g., provider-id-success.log)
  the failed routes of requests for that provider (e.g., provider-id-error.log)

In the above example, the provider-id.log may be available for download by the administrator, so that a human administrator may run his own set of scripts on that data and maybe glean something only he wants to see from it. The provider-id-success.log and provider-id-error.log may be plotted for each provider (e.g. using gnuplot during the parsing), so that the provider-human, who doesn't know how or doesn't have the time to pipe the log to his own charting tools, may visualize the correspondence between time, number of successful routes, and number of failed routes.

In the above example, a failed route may be one where the provider didn't accept the connection or took too long and the router "hung up." In one embodiment, for example, parsing logs may generate logs and graphs for three time-periods: monthly, weekly, and daily, and may be shown to the administrator through an easy point-and-click HTML interface.

In some embodiments, routing queries to providers may be based on their similarity with other providers. Providers may have not registered the query keywords. Similarity may be computed using mutual information on previous positive responses. Alternatively, Hebbian learning, 2D histograms, joint density distribution, etc. may be used to determine other providers that a query may be routed to even if the query did not match the other provider's registration.

One embodiment of a distributed information discovery platform may be implemented in a peer-to-peer environment based on a peer-to-peer platform as described herein. In this embodiment, the distributed information discovery platform may include a router that is configured to operate in the peer-to-peer environment based on the peer-to-peer platform. In one embodiment, this router may work as follows:
  opens an output pipe to the provider end point;
  sends the message to the provider end point using the pipe;
  accepts responses from providers on a dedicated input pipe.

The peer-to-peer platform router may include, but is not limited to, the following components:
  a component that can receive requests from peer-to-peer platform peers
  a component that can route queries to peer-to-peer platform peers
  a component that can receive responses from peer-to-peer platform peers.

The component that receives requests from peer-to-peer platform peers may listen to an input pipe for query requests. When a query request arrives, the resolver resolves a set of peers to route the query to. If the peer is a peer-to-peer platform-based peer, the peer-to-peer platform router may send the request over an output pipe to that peer's input pipe. The peer-to-peer platform router may include one input pipe dedicated to receiving query responses from peer-to-peer platform peers. When a sufficient condition has been met to flush responses back to the requesting peer, the peer-to-peer platform router may send the request peer a query response message.

The distributed information discovery platform query routing protocol may map to peer-to-peer platform pipes in a straightforward manner. Peer-to-peer platform pipes provides a path to transport the query request, query response, and registration messages in the peer-to-peer environment. In each case, the query routing protocol message is enveloped by a peer-to-peer platform message.

For query request messages, the peer-to-peer platform message may include two tag/value pairs: "request" and "responsePipe". The actual query request message may be stored as the value of the "request" tag. The pipe advertisement for the pipe the peer wishes to receive the responses on may be stored as the value of the "responsePipe" tag. Using an output pipe, a peer delivers the query response peer-to-peer platform message to the input pipe of a distributed information discovery platform peer.

Query response messages may include the tag/value pair: "responses". When a distributed information discovery platform peer has obtained an answer to a query request, it may open an output pipe to the pipe specified in the query request message's "responsePipe" tag and sends the query response peer-to-peer platform message with the "responses" tag filled in with the response.

Registration messages may include the tag/value pairs: "registration" and "responsePipe". The registration document may be stored inside the "registration" tag. The pipe advertisement for the pipe the peer wishes to receive the responses on may be stored as the value of the "responsePipe" tag. Using an output pipe, the peer may send this message to a distributed information discovery platform hub (which itself may be a peer-to-peer platform peer). The peer receiving the registration may process the registration and send back a success or failure code to the pipe specified by the "responsePipe" tag in the registration message.

One embodiment of a distributed information discovery platform may be implemented on a network that supports HTTP. In one embodiment, a router for HTTP networks may work as follows:

Opens a connection to each provider over HTTP.
Sends the message to the provider over this connection
Awaits responses from providers over this connection.
The HTTP router may also use KEEP_ALIVE to maintain a connection to each provider it has already queried. The router may then make multiple requests to this provider over a single connection, remembering, for a given provider, the queue of requests. This method may prevent repeated opening and closing of connections to providers.

Using HTTP, a query request may be sent as an HTTP post to a provider QRP interface, and the provider may process the request. For example:

```
POST /abcdsearch.jsp HTTP/1.0
Content Type: text/xml
<?xml version='1.0'?>
. . . .
``` would post the query message to the provider QRP interface "abcdsearch.jsp".

Queries are sent to providers with HTTP. A POST request may be used. In one embodiment, the content type of the request should be "text/xml". The body of the request may include the query. In one embodiment, the query is an XML document.

In one embodiment, the distributed information discovery platform may provide a consumer-focused web front end for querying providers and presenting responses. This front end may perform the following functions:

Aggregation of responses: provider responses are returned by the router and aggregated by the front end.
Presentation of responses: responses are presented in raw HTML format as they are received by the router from the providers.
Query ranking: responses are ranked according to the relevance of the query to the responses.
Provider signup facilities: for providers to sign up to register their endpoints and monitor their statistics.

Some embodiments may employ bidding on search queries to improve relevance in a distributed search system. For example, a distributed information discovery platform may provide a method to determine relevance of provider responses in which:

each provider is allocated a specific number of "tokens".
when a provider receives a query, in addition to its responses it specifies the number of tokens which it is prepared to bid to have the responses displayed
when the routing system collates all the responses, it considers the amount of tokens bid by each provider in its ranking algorithm. The more tokens bid, the higher the rank of that response.
tokens may be used up every time a provider bids on a query, and may be redeemed when a user clicks on a response. In this way, providers with consistently useful responses may rise to the top of the list over time.

This bidding method may provide for search results to be ranked within a distributed environment. Bidding may also address spamming that occurs when providers send irrelevant responses deliberately to draw users to their resources.

In some embodiments, user feedback may be coupled with provider bidding for query resolution. In some embodiments, provider calculated relevance may be combined with relevance determined by the distributed information discovery router system. In some embodiments, personalized (e.g. thru cookies) information could be applied for relevance determination.

In one embodiment, each provider may be allocated a limited amount of tokens per day, per week, etc. When the tokens are used up, the provider's results may be dropped to the bottom of the list.

In some embodiments, a score may be used for each entry in the registration index to select providers who performed well in the past on similar queries. Different methods may be used for index score update. The registration index may be dynamic in a sense that terms may added and deleted based on user queries and provider performance, and not only based on provider registrations.

In one embodiment, providers may respond to queries with an XML 'result' document, which may have the following DTD, for example:

```
<!DOCTYPE result [
<!ELEMENT result - - (base-href?, icon?, hit*)>
<!ELEMENT base-href - - (#PCDATA)>
<!ELEMENT icon - - (#PCDATA)>
<!ELEMENT hit - - (href, anchor, html?, relevance?)>
<!ELEMENT href- - (#PCDATA)>
<!ELEMENTanchor --(#PCDATA)>
<!ELEMENT html - - (#PCDATA)>
<!ELEMENT relevance - - (#PCDATA)>
]>
```

In this example, a result may include:
an optional base-href URL, providing defaults for URLs in the results.
an optional icon URL, providing an icon for the provider.
a sequence of hits.
Each hit may include:
an href URL, naming the location of this hit.
anchor text, describing the hit.
optionally, some html describing the hit.
optionally, the relevance of this hit, e.g. as a number between 1 and 100.
For example, an HTTP request of the form:

```
POST /search.jsp HTTP/1.0
Content-Type: text/xml
Schema: http://www.infrasearch.com/opensearch
<query><text>foo bar</text></query>,
``` might get an HTTP response of the form:

```
Content-Type: text/xml
<result>
    <icon>http://foo.com/images/icon.gif</icon>
    <base-url>http://foo.com/</base-url>
    <hit>
        <href>/documents/foo.txt</href>
        <anchor>Foo</anchor>
        <relevance>50</relevance>
    </hit>
```

```
-continued

<hit>
    <href>/documents/bar.txt</href>
    <anchor>Bar</anchor>
    <relevance>35</relevance>
</hit>
</result>
```

One problem that arises in a network with many information providers is that if a user issues a common query such as "dog" or "car" or "stocks", the multitude of information providers that have valid responses may overwhelm the user. For example, car parts databases, manufacturers, and local dealers may try to respond to an overly generic query of "car." Three-letter words are not the only queries that pose this problem. Queries such as "stocks" or "company earnings" still present the same problem.

The above problem may be solved with a better results-ranking algorithm because what the user is actually looking for is under-described. A distributed information discovery platform may include functionality to guide the user to what he or she actually wants to see. Results from providers may be broken into logical groups, such that a user can pick which group of results the user considers relevant to the search. In some embodiments, multiple layers may be provided so that the user may continue picking subgroups of subgroups, until the user sees an interesting set of results. To present the user with grouped results, a hierarchical document-clustering algorithm may be used.

In some embodiments, the distributed information discovery platform may be applied to consumer web search applications. The distributed information discovery platform may have many other applications as well, some of which are summarized below by way of example:

Consumer Web Search:

The distributed information discovery platform may be applied for consumer web search. Since the distributed information discovery platform may be orthogonal to current crawler based approaches, it may be used in conjunction with a traditional search engines as a complementary discovery engine. Whereas crawler based approaches may be fine for static content, the distributed information discovery platform may handle searches for deep, dynamic content such as news, product information and auctions.

B2B (Business-to-Business) Networks:

The distributed information discovery platform may be employed for B2B networks such as exchanges and supply chain networks. Whereas the conventional approach to data synchronization in exchanges is to replicate buyer and seller data at the exchange, a peer-to-peer approach may be more efficient. Using a private network version of the distributed information discovery platform, trading partners may search for information across a range of partners' databases all connected via a common query protocol. In addition, since the distributed information discovery platform allows the specification of arbitrary schemas for searching, partners may rapidly adapt their existing corporate databases to communicate via the query routing network.

Extranet Applications:

The distributed information discovery platform may be applied to the integration of extranet resources between business partners. As an example, consider the case of a customer complaining to computer vendor about a problem with their PC. The customer service representative at the computer vendor may be faced with the problem of searching multiple partner databases to find the solution to the problem. The distributed information discovery platform may be used to rapidly integrate web-enabled databases from their partners and search them in a consistent fashion.

Peer-to-Peer Networks:

In addition or alternatively to being used with standard web network protocols, the distributed information discovery platform may be applied to a peer-to-peer network discovery model. The peers in a distributed information discovery network may be large servers, PCs, workstations, cell phones, etc. The distributed information discovery platform may provide a consistent discovery framework linking various peer-to-peer networks together.

In addition to supporting arbitrary XML, the distributed information discovery platform may be integrated with other standard initiatives such as the Resource Description Framework (RDF) for describing metadata and queryspace vocabularies, XML-RPC (XML-Remote Procedure Call (RPC)) for exposing interfaces in a standard manner, Rich Site Summary (RSS) (previously known as RDF Site Summary), Simple Object Access Protocol (SOAP) and Microsoft's .NET.

In addition to supporting public networks, the distributed information discovery platform may also include support for private networks, e.g. for business-to-business (B2B) networks and extranet applications. Private network support may include quality of service provisioning, security via public key infrastructure and explicit B2B queryspace support.

For public network applications, "spam" may be addressed in a variety of ways, including comparison of the site registration to an inferred registration, tracking of searches made and results returned and allowing consumer input (voting).

In some embodiments, the resolver may use simple keyword based matching of query terms to registrations. In other embodiments, the resolver may be extended, for example, to allow for category based matching of terms to registrations and/or adaptive learning of provider performance, e.g. learning which providers return relevant results given certain kinds of queries.

Note that the distributed information discovery platform may search across heterogeneous communication protocols and systems and present results using any number of different protocols and system. For example, one embodiment of a distributed information discovery system may search JSP-based HTTP systems simultaneously with Perl-based XML systems and Java-based peer-to-peer systems. The distributed information discovery system may then present the results in HTTP-based HTML or according to a peer-to-peer protocol or any other protocol/medium combination.

In one embodiment, the distributed information discovery platform may include a Provider Information Service that may include a database and management service for provider information such as contact details, billing information, etc.

In one embodiment, the distributed information discovery platform may include a user preferences service that may include a database and management service for end user preferences. Users of the web client may register as users and have the front-end application remember their preferences. In one embodiment, user preferences may be used to provide personalized searching. For example, a user may specify a maximum number of results to be returned.

Embodiments of the distributed information discovery platform may include an monitoring and management tool or tools. Administrators may use the tool(s) to monitor and mange the performance of the distributed information discovery platform. For example, monitoring tools may provide information on the number of searches performed, most popular keywords, most popular clients, most popular providers, etc. Also, performance information on the servers, database uptime etc. may be provided by the tool(s). Management tools may provide the ability to remotely suspend traffic to a provider, for example.

Query Routing Protocol

The following section describes one embodiment of a query routing protocol that may be used in embodiments of the distributed information discovery platform. The query routing protocol may include, but is not limited to, the following components:

Query Request
Query Response
Registration

This section describes how these queries, responses and associated registrations by providers are implemented by the query routing protocol.

The following is an example of the format of a simple text query for the term "foo":

```xml
<?xml version='1.0'?>
<request xmlns="http://abcd.org/search"
    xmlns:t="http://abcd.org/search/text"
    uuid="1C8DAC3036A811D584AEC2C23">
    <query>
        <t:text>
            foo
        </t:text>
    </query>
</request>
```

Query messages may be structured as follows:
The default namespace may be specified by a URI such as "http://abcd.org/search".
The query message is contained within the envelope <request> . . . </request>.
The query unique ID is specified in the uuid attribute of the <request> tag.
The query space is specified within the tags <query-space> . . . </query-space>
The actual query data is enveloped within the tags <query> . . . </query>.
The query data may be arbitrary XML within a namespace that matches "http://abcd.org/search/text", which includes the tag <text> to specify free text, or within any other namespace specified by the <query-space> definition.

A response to the this query answered by a peer-to-peer platform peer may look like this:

```xml
<?xml version='1.0'?>
<response xmlns="http://abcd.org/search">
    <text>
        Hi, I'm a peer-to-peer platform peer
    </text>
</response>
```

The response message may be structured as follows:
The default name space is "http://abcd.org/search".
The response message is enveloped within the <response> . . . </response> tags.
The body of the response may be arbitrary XML as long as it corresponds to the specified queryspace and corresponding namespace, e.g. the queryspace "http://abcd.org/search" includes the <text> tag.

Providers may be any peer within the network, including peer-to-peer platform peers running the distributed information discovery platform and HTTP peers adapted to the query routing protocol.

A more complex example is shown below:

```xml
<?xml version='1.0'?>
<request id="1C8DAC3036A811D584AEC2C23"
    query-space="http://bigbookseller.com/js"
    xmlns="http://abcd.org/search"
    xmlns:books="http://bigbookseller.com/search">
    <query>
        <b:author>
            John Doe
        </b:author>
        <b:title>
            Widgets
        </b:title>
    </query>
</request>
```

In this example the query space is defined as "http://bigbookseller.com/search". The namespace "books" therefore matches the URI for this query space (this is a requirement for Distributed information discovery platform messages using queryspaces). The query specifies that the "author" within the name space "books" should be "John" or "Doe" or that the title should contain "Widgets".

A response to this query may look like this if answered by e.g. efgh.com:

```xml
<?xml version='1.0'?>
<response xmlns="http://abcd.org/search"
    xmlns:b="http://bigbookseller.com/search"
    query-space="http://bigbookseller.com/search">
    <b:authors>
        John Doe, Jane Doe
    </b:authors>
    <b:URL>
        http://www.efgh.com/exec/obidos/ASIN/0201310082
    </b:URL>
    <b:title>
        Foos, Gadgets and Widgets
    </b:title>
    <b:price>
        $39.95
    </b:price>
    <b:abstract>
        A definitive technical reference for foos, gadgets and
        widgets, written by the inventors of the technologies.
    </b:abstract>
</response>
```

Let's now look at the registration file for a provider:

```xml
<?xml version='1.0'?>
<register xmlns="http://abcd.org/search"
    query-server=http://hijk.com/lmno/i>
    <predicate>
        <query>
            <text>
                html java xml
            </text>
        </query>
    </predicate>
</register>
```

Registrations are structured as follows:
The registration body is enveloped within <register> . . . </register> tags.
The query server, i.e. the URL or Pipe ID of the provider to send the queries to is specified within <query-server> . . . </query-server>.
The "predicate", i.e. the logical statement which the queries must match to be routed to this provider is enveloped within <predicate> . . . </predicate> tags.
The predicate includes the queries that will be matched by this provider, each enveloped within <query> . . . </query> tags. Each predicate may contain multiple <query> envelopes.
The query body can contain arbitrary XML as long as it matches the namespace that matches the specified query-space for this provider.
In this example the provider specified by the query-server "http://hijk.com/lmno/i" has registered for the query <text> html java xml</text>, i.e. queries containing the text terms "html", "java" or "xml" will be routed to Rael's query server.
An example registration for efgh.com would look like this:

```
<?xml version='1.0'?>
<register xmlns="http://abcd.org/search"
    xmlns:b="http://bigbookseller.com/search"
    query-space="http://bigbookseller.com/search">
    <query-server>http://efgh.com/exec/search</query-server>
    <predicate>
        <query>
            <b:author>
                John Doe Jane Doe
            </b:author>
            <b:title>
                Foos Gadgets Widgets
            </b:title>
        </query>
    </predicate>
<register>
```

Each query request message includes the following tags:

```
<request uuid="uuid details">
    <query-space>
    <query>
```

In one embodiment, although <query-space> defines a name for the type of query that is being performed, a name space may be used with the same value as that specified in <query-space> for all the queryspace-specific tags. One embodiment may use a full XML schema framework for defining and validating queryspaces.

In addition, the request message may contain optional attributes, e.g. contained inside the request tag. If these attributes are not specified, defaults may be assumed. The following is an exemplary request

```
<request
    . . .
    flushafter=5
    providerhits=2
    timeout=2
    . . .
>
```

The following table describes some attributes that may be included in a query request message:

| Attribute | Meaning |
| --- | --- |
| max-hits-per-provider | Number of hits expected from a provider |
| flush-after | flush the output stream to the client after receiving responses from n providers |
| query-uuid | Unique ID of the query |
| query-life-time | number of seconds the query is valid |
| max-fanout | number of providers to forward the query to |

Peer-to-Peer Platform

Instead of deploying a single set of software (an OS, with its device drivers, and applications) on many hardware platforms, the peer-to-peer platform described herein creates a protocol-based network platform. This approach allows many network nodes to adopt one or more of the protocols of the platform. A "network node" is a node on the network that may participate in (i.e. be a peer in) the peer-to-peer network platform. The peer-to-peer platform may provide infrastructure services for peer-to-peer applications in the peer-to-peer model. The peer-to-peer platform may provide a set of primitives (infrastructure) for use in providing services and/or applications in the peer-to-peer distributed fashion. The peer-to-peer platform may provide mechanisms with which peers may find each other, cooperate with each other, and communicate with each other. Software developers may use the peer-to-peer platform as a standard to deploy inter-operable applications, services and content. Thus, the peer-to-peer platform may provide a base on which to construct peer-to-peer network computing applications on the Internet.

The peer-to-peer platform may provide a mechanism for dynamically creating groups and groups of groups. The peer-to-peer platform may also provide mechanisms for peers to discover (become aware of) other peers and groups, and mechanisms for peers and/or peer groups to establish trust in other peers and/or peer groups 304. The peer-to-peer platform may also provide a mechanism for monitoring peers and peer groups 304, and for metering usage between peers and peer groups 304. The peer-to-peer platform may also provide a mechanism for tracking peers and peer groups 304, and for establishing a control policy between peers and in peer groups 304. The peer-to-peer platform may also provide a security layer for verifying and authorizing peers that wish to connect to other peers or peer groups 304.

In one embodiment, peers (and therefore the entire collective platform of peers) may be defined by:
  a set of protocols implemented, and used by the peer;
  an underlying software platform and network transports used by the peer;
  rules and conventions governing the peer's role in the platform; and
  a set of resources produced (exported to others) and consumed (imported from others) by the peer.

The peer-to-peer platform protocols may provide inter-operability between compliant software components (executing on potentially heterogeneous peer runtimes). The term compliant may refer to a single protocol or multiple protocols. That is, some peers may not implement all the defined protocols. Furthermore, some peers may only use a portion (client-side or server-side only) of a particular protocol. The protocols defined by the peer-to-peer protocol may be realized over a network. Networks that may support the peer-to-peer platform protocols may include, but are not limited to, wireless and wired networks such as the Internet, a corporate intranet, Local Area Networks (LANs), Wide Area Networks (WANS), and dynamic proximity networks. One or more of the protocols of the peer-to-peer platform may also be used within a single computer. The size and complexity of the network nodes supporting these protocols may range from a simple light switch to a complex, highly available server and even to mainframe and supercomputers.

In one embodiment, the distance, latency, and implementation of peer software is not specified by the peer-to-peer platform protocols, only a common discovery and communication methodology, creating a "black box" effect. The definitions of protocol and peer software implementation issues may be referred to as a binding. A binding may describe how the protocols are bound to an underlying network transport (like TCP/IP or UDP/IP) or to a software platform such as UNIX or Java.

Peers that wish to cooperate and communicate with each other via the peer-to-peer platform may do so by following a set of rules and conventions called a policy. Each policy may orchestrate the use of one or more protocols operating on a set of platform resources. A common policy adopted by peers with different implementations may allow the peers to appear as a single distributed system. The policies may range from tightly-coupled to loosely-coupled policies. Tightly-coupled policies may create tightly-coupled systems. Loosely-coupled policies may create loosely coupled systems. The policies may rely on the set of protocols provided by the peer-to-peer platform. In one embodiment, some policies may be standard and operate in a wide variety of deployments. These standard policies may be referred to as the peer-to-peer platform standard policies. In one embodiment, custom policies may be supported. Policies may offer a means of tailoring the peer-to-peer platform to a problem, using centralized, decentralized, or hybrid approaches where appropriate. In one embodiment, these policies may be made open to all vendors, software developers, and IT managers as a means of adapting peer-to-peer platform to a networking environment and to the problem at hand.

In one embodiment, the peer-to-peer platform core protocols may be decentralized, enabling peer-to-peer discovery and communication. One embodiment provides standard plug-in policy types that may offer the ability to mix-in centralization as a means of enabling Efficient long-distance peer lookup and rendezvous using peer naming and discovery policies;

Simple, low-cost information search and indexing using sharing policies; and

Inter-operability with existing centralized networking infrastructure and security authorities in networks such as corporate, public, private, or university networks using administration policies.

In one embodiment, a network node using the peer-to-peer platform (i.e. a peer) may provide one or more advertisement documents. Each advertisement document may represent a resource somewhere on the peer, or even on another device or peer. In one embodiment, all advertisement documents may be defined in a markup language such as XML and therefore may be software platform neutral. Each document may be converted to and from a platform specific representation such as a Java object. The manner in which the conversion takes place may be described in the software platform binding.

In one embodiment, the peer-to-peer platform may allow software implementation issues to be dealt with by the underlying software platform (e.g. Java, UNIX, or Windows). The combination of standard policies, platform resource advertisements, and flexible binding practices may yield a flexible system that may scale to Internet proportions.

In one embodiment, the peer-to-peer platform architecture may be defined in terms of its protocols, resource advertisements, and standard policies. The peer-to-peer platform protocols may be realized within various software platforms, such as the Java platform. Network protocol bindings may serve to ensure inter-operability with existing content transfer protocols, network transports, routers, and firewalls. Software platform bindings may describe how protocol stacks are implemented, and how advertisements are converted to and from language constructs (such as objects) that represent the advertised resource (such as a peer group). In one embodiment, the Java platform may be used to create Java-based peer-to-peer platform peers. HTTP is a common reliable content transfer protocol that may be used in the peer-to-peer platform. Other content transfer protocols may also be supported. TCP is a common reliable connection protocol that may be used in the peer-to-peer platform. Other connection protocols may also be supported. UDP is a common Datagram message protocol that may be used in the peer-to-peer platform. Other message protocols may also be supported.

The peer-to-peer platform may mold distinct network nodes called peers into a coherent, yet distributed peer-to-peer network computing platform. In preferred embodiments, the platform may have no single point of configuration, no single point of entry, and no single point of failure. In one embodiment, the peer-to-peer network computing platform may be completely decentralized, and may become more robust as it expands through the addition of network nodes. Unlike tightly-coupled systems, the high level of robustness delivered by peer-to-peer platform may be achieved without sacrificing simplicity. The peer-to-peer platform may be a very simple platform that preferably does not rely on high-speed interconnects, complex operating systems, large disk farms, or any other technology on which traditional tightly-coupled systems rely.

Network nodes (called peers) of various kinds may join the platform by implementing one or more of the platform's protocols. Various nodes including, but not limited to, Java, SPARC, x86, PowerPC, and ARM-based nodes may all be placed on an equal footing as "peers", with no one node type favored over any other node type. Each peer may operate independently of any other peer, providing a degree of reliability not commonly found in tightly-coupled homogeneous systems. Peers may discover each other on the network in order to form loosely-coupled relationships.

Peers may contain software components that act as clients and services that request and provide platform functions respectively. A software component may act as a client, a service, or both. The peer-to-peer platform may recognize different kinds of software components within a peer including, but not limited to:

policies—a policy is a named behavior, rule, or convention that is to be followed by each member of a peer group (may or may not be loadable from the network and/or a storage medium such as a disk);

clients—a client is a software component that may request a platform function by invoking a protocol;

services—a service is a named, loadable library of code providing a platform function. a service may be viewed as a means of encapsulating a policy implementation; and applications—an application is a named, loadable service that interacts with a user, for example using a GUI.

Figure 9:
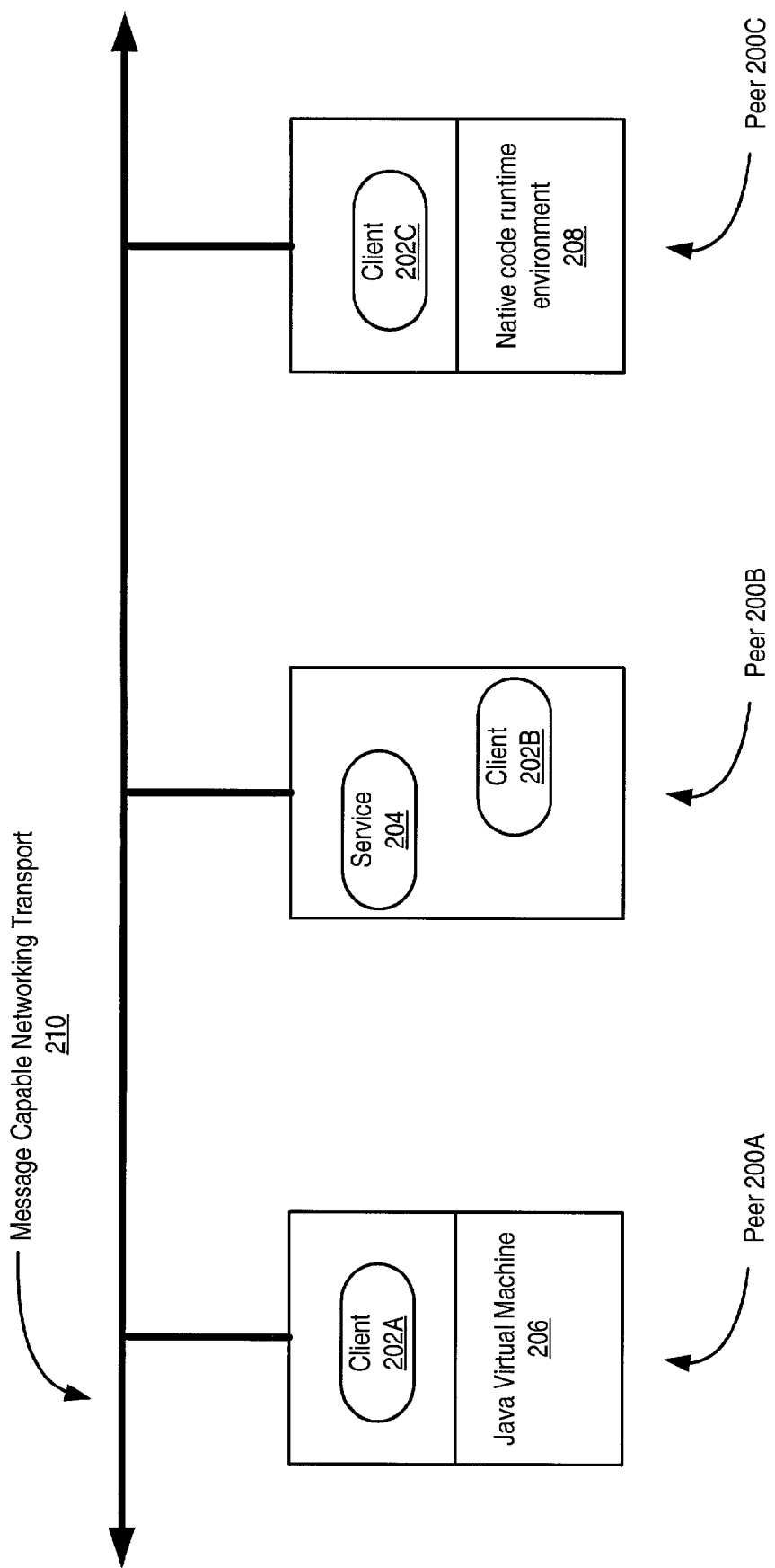
FIG. 9 illustrates an example of several peers in a peer-to-peer network according to one embodiment.

FIG. 9 illustrates an example of several peers 200 in a peer-to-peer network according to one embodiment. Peer 200A may be executing a Java Virtual Machine (JVM) 206, and client 202A may be executing on the JVM 206. Peer 200C may be executing a native code runtime environment 208, and client 202C may be executing within the environment 208. Peer 200B may include a client 202B and a service 204. Peer 200B may provide advertisement to service 204. Clients 202A and 202C may request and, if authorized, be granted access to service 204. Client 202B may also access service 204.

In one embodiment, peer-to-peer protocols may be embodied as markup language (e.g. XML) messages sent between peer software components acting as clients and services. Peer-to-peer platform messages may define the protocol used to connect the components, and may also be used to address resources offered by the component. The use of policies and messages to define a protocol allows many different kinds of nodes to participate in the protocol. Each node may be free to implement the protocol in a manner best suited to the node's abilities and role(s). For example, not all nodes may be capable of supporting a Java runtime environment; the protocol definition may not require or imply the use of Java on a node.

In one embodiment, the peer-to-peer platform may use markup language (e.g. XML) messages as a basis for providing Internet-scalable peer-to-peer communication. Each peer's messaging layer may asynchronously deliver an ordered sequence of bytes from client to service, using a networking transport. The messaging layer may maintain the notion (on both client and service) that the sequence of bytes is one atomic unit. In one embodiment, messages are sent to endpoints. An endpoint is a destination (e.g. a Uniform Resource Identifier (URI)) on any networking transport capable of sending and receiving Datagram-style messages. In one embodiment, the peer-to-peer platform does not assume that the networking transport is IP-based. The messaging layer may use the transport specified by the URI to send and receive messages. Both reliable connection-based transports such as TCP/IP and unreliable connectionless transports like UDP/IP may be supported. Other message transports such as IRDA, and emerging transports like Bluetooth may also be supported by using this endpoint addressing scheme.

In one embodiment, peer-to-peer platform messages are Datagrams that may contain an envelope, a stack of protocol headers with bodies, and an optional trailer. In one embodiment, the envelope may contain a header, a message digest, a source endpoint (optional), and destination endpoint. In on embodiment, each protocol header includes a <tag> naming the protocol in use and a body length. In one embodiment, a protocol body may have a variable length amount of bytes that is protocol <tag> dependent. In one embodiment, a protocol body may include one or more credentials used to identify the sender to the receiver. In one embodiment, a variable-length trailer (could be zero) consisting of auditing information may be piggybacked on a message. The trailer size may be computed by subtracting the body size and envelope size from the total size specified in the envelope. In one embodiment, the right to piggyback trailer information may be regulated by the messaging credentials in the message. When an unreliable networking transport is used, each message may be delivered once to the destination, may be delivered more than once to the destination, or may not arrive at the destination. On an unreliable networking transport, messages may arrive at a destination in a different order than sent.

Policies, applications and services layered upon the core protocols are responsible for message reordering, duplicate message removal, and for processing acknowledgement messages that indicate some previously sent message actually arrived at a peer. Regardless of transport, a message may be unicasted (point-to-point) between two peers. Messages may also be broadcasted (like a multicast) to a peer group. In one embodiment, no multicast support in the underlying transport is required.

One embodiment of a peer-to-peer protocol may support credentials in messages. A credential is a key that, when presented in a message body, is used to identify a sender and to verify that sender's right to send the message to the specified endpoint. The credential is an opaque token that may be presented each time a message is sent. The sending address placed in the message envelope may be cross-checked with the sender's identity in the credential. In one embodiment, credentials may be stored in the message body on a per-protocol <tag> basis. In one embodiment, each credential's implementation may be specified as a plug-in policy, which may allow multiple authentication policies to coexist on the same network.

Figure 10:
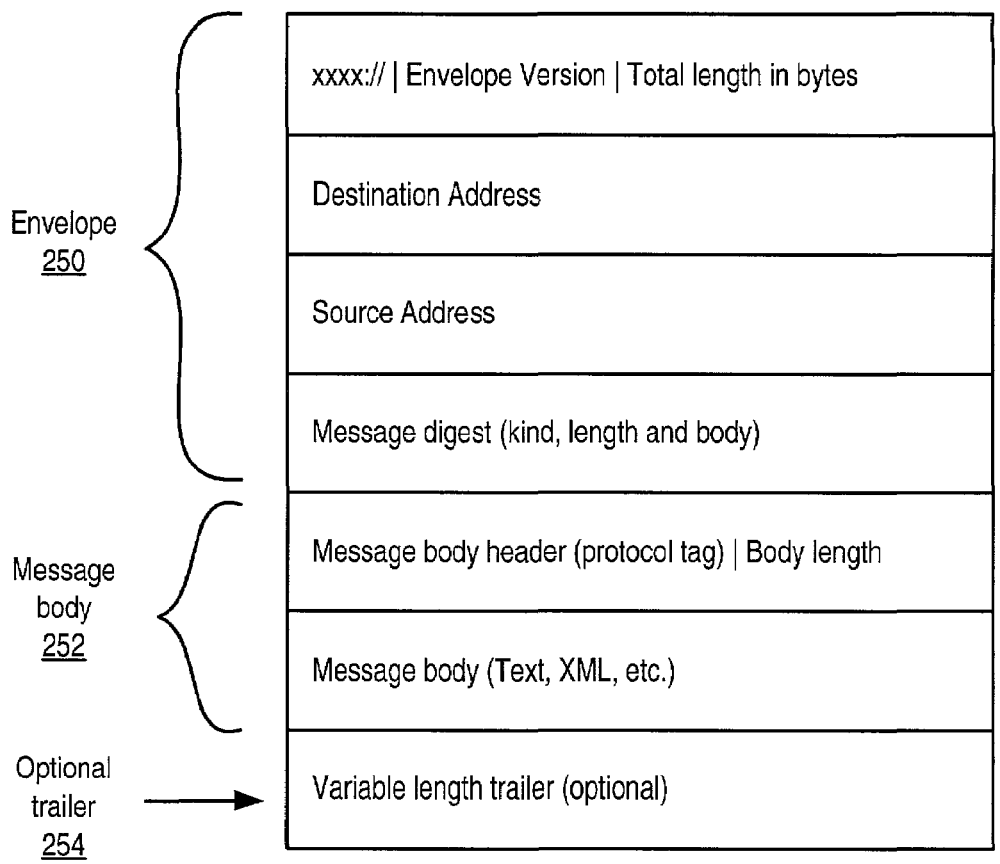
FIG. 10 illustrates a message with envelope, message body, and optional trailer according to one embodiment.

In one embodiment, peer-to-peer platform messages may be defined in a markup language such as XML. FIG. 10 illustrates a message with envelope 250, message body 252, and optional trailer 254 according to one embodiment. A message may include multiple message bodies 252.

The peer-to-peer platform may provide pipes for information exchange between peers. A pipe encapsulates a message-based protocol and a dynamic set of endpoints. In one embodiment, a pipe requires that the encapsulated protocol be unidirectional, asynchronous, and stateless. Pipes connect one or more peer endpoints. In one embodiment, at each endpoint, software to send or receive, as well as to manage associated queues or buffers, is assumed, but not mandated. These pipe endpoints may be referred to as pipe input and output endpoints. In one embodiment, a pipe may be associated with a group and not with individual peers. Peer communication endpoints (both input and output) may be bound and unbound from a pipe in a dynamic fashion, providing an abstract "in and out" mailbox that is independent of any single peer. When a message is sent into a pipe, the message may be sent to all peer endpoints currently connected (listening) to the pipe. In one embodiment, the set of currently connected endpoints may be obtained using a pipe resolver protocol. In one embodiment, a pipe may offer point-to-point communication. A point-to-point pipe connects two peer endpoints together, i.e. an input endpoint that receives messages sent from the output endpoint. In one embodiment, no reply operation is supported. Additional information in the message payload (like a unique identifier) may be needed to thread message sequences. In one embodiment, a pipe may offer broadcast communication. A broadcast pipe may connect multiple input and output peer endpoints together. Messages flow into the pipe from output endpoints and pass by listening input endpoints. A broadcast message is sent to all listening endpoints simultaneously. This process may actually create multiple copies of the message to be sent. In one embodiment, when peer groups map to underlying physical subnets in a one-to-one fashion, transport multicast may also be used as an implementation optimization provided by pipes.

In a peer-to-peer network platform, peers may cooperate and communicate in peer groups that follow rules and conventions known as policies. Each cooperation or communication policy may be embodied as a named behavior, rule, or convention that may be followed by each member of a peer group. The behavior is typically encapsulated in a body of code packaged, for example, as a dynamic link library (DLL) or Java Archive (JAR) file, but any embodiment is allowed. In one embodiment, a policy name may include a canonical name string and a series of descriptive keywords that uniquely identifies the policy. In order to use a policy, a peer may locate an implementation suitable for the peer's runtime environment. Multiple implementations of the same policy allow Java and other non-native peers to use Java (or other) code implementations, and native peers can use native code implementations. In one embodiment, a standard policy resolver protocol may be used to find active (i.e. running on some peer) and inactive (i.e. not running, but present on some peer) implementations. In one embodiment, once an implementation has been activated, the policy resolver may be used in an ongoing manner to perform Inter-Policy Communication (IPC) without having to create a pipe. Low-level policies, in particular, may need a communication mechanism that does not rely on pipes. The pipe transport policy for example, may not be able to use a pipe to communicate with instances of itself. In one embodiment, policy implementations may be preconfigured into a peer or may be loaded from the network. In one embodiment, the process of finding, downloading and installing a policy implementation from the network may be similar to performing a search on the Internet for a web page, retrieving the page, and then installing the required plug-in. Once a policy is installed and activated, pipes or the policy resolver protocol may be used by the implementation to communicate with all instances of the same policy.

In one embodiment, a policy may have a name that also indicates the type and/or purpose of the policy. An optional set of keywords may further describe the policy. In one embodiment, the name and keyword elements may be stored within a markup language (e.g. XML) policy advertisement document. Each policy advertisement document may be embedded in a peer group's advertisement document. In one embodiment, a policy advertisement may provide the policy resolver with only a portion of the search criteria needed to find a suitable implementation. The other information needed to execute a successful policy search may include a peer advertisement. In one embodiment, a peer advertisement may include, but is not limited to, a peer's:

- communication endpoints (addresses on its active network transports);
- runtime name (Java, SPARC, x86, etc.);
- additional runtime constraints and requirements (optional);
- peer name (optional); and
- security policies (optional).

In one embodiment, a peer group may include two or more cooperating peers that adhere to one or more policies. In one embodiment, the peer-to-peer platform does not dictate when, where, or why to create a peer group. The kinds of peer groups found in the platform are determined by the set of policies assigned to those groups. In one embodiment, peers wishing to join a peer group may first locate a current member of the peer group, and then request to join the peer group. The application to join may either be rejected or accepted by one or more of the current members. In one embodiment, membership acceptance policies may enforce a vote, or alternatively may elect one or more designated group representatives to accept or reject new membership applications. The peer-to-peer platform recognizes several motivations for creating or joining peer groups including, but not limited to, communication and content sharing.

One embodiment of the peer-to-peer platform may provide support for communication and content sharing groups including, but not limited to, the ability to find nearby peers, the ability to find named peers anywhere on the peer-to-peer platform, the ability to find named peer groups anywhere on the peer-to-peer platform, and the ability to find and exchange shared content.

One embodiment of the peer-to-peer platform may provide a discovery policy that may be used to search for peers, and peer groups 304. The search criteria may include a peer or peer group name (string). One embodiment of the peer-to-peer platform may provide an authentication policy that may be used to validate, distribute, and authenticate a group member's credentials. The authentication policy may define the type of credential used in the message-based protocols used within the peer group. The authentication policy may be the initial point of connect (like a login) for all new group members.

One embodiment of the peer-to-peer platform may provide a membership policy that may be used by the current members to reject or accept a new group membership application. Current members may use the membership policy during the login process. One embodiment of the peer-to-peer platform may provide a content sharing policy that may define the rules for content exchange. Each peer in a group may store content. The sharing policy may encapsulate such behaviors as access, replication, and searching.

One embodiment of the peer-to-peer platform may provide a policy resolver policy that may be used to execute the implementation search. Once the implementation is activated, the resolver may maintain its name and status within the peer and respond to requests to find active policies. One embodiment of the peer-to-peer platform may provide a pipe resolver policy that may be used to locate all the peers using (e.g. bound to) a specific pipe.

Network peer groups may be formed based upon the proximity of one peer to another peer. Proximity-based peer groups may serve to subdivide the network into abstract regions. A region may serve as a placeholder for general communication and security policies that deal with existing networking infrastructure, communication scopes and security requirements. In one embodiment, the peer-to-peer platform may include a network peer group discovery protocol that may be used by peers to find network regions and to obtain a region's peer group advertisement document.

As an individual peer boots, it may use the network peer group discovery protocol to determine information including, but not limited to:

- what network region the peer is attached to;
- what policies are associated with this region of the network. In one embodiment, administration and security policies may be embedded within the net peer group advertisement to help peers identify which policies may be required within the local existing network infrastructure;
- what other peers are attached to this same network region; and
- what services exist on those other peers attached to this same network region.

The network regions are virtual regions. In other words, their boundaries may or may not reflect any underlying physical network boundaries such as those imposed by routers and firewalls. In one embodiment, the concept of a region may virtualize the notion of routers and firewalls, subdividing the network in a self-organizing fashion without respect to actual physical network boundaries.

Content peer groups may be formed primarily to share resources such as services and files. Content peer groups may contain peers from any network peer group, or even peers that do not belong to a network peer group. The rules of sharing content may be determined by the peer group's content sharing policy. Each peer in the content peer group may store a portion of the overall group content. Peers may work together to search, index, and update the collective content. The use of filenames to identify shared content may cause problems including naming collisions. In one embodiment, the peer-to-peer platform addresses this shared content naming problem by letting services and applications use metadata to describe shared content. The metadata may contain much more specific information (e.g. XML-typed information) that may prevent collisions and improve search accuracy. Furthermore, in one embodiment, multiple metadata descriptors (called content advertisements) may be used to identify a single instance of shared content. Allowing multiple advertisements enables applications and services to describe content in a very personal, custom manner that may enable greater search accuracy in any language.

The peer-to-peer platform's security model may be orthogonal to the concepts of peers, policies, peer groups 304, and pipes in the peer-to-peer platform. In one embodiment, security in the peer-to-peer platform may include, but is not limited to:

credentials—a credential is an opaque token that may provide an identity and a set of associated capabilities;

authenticators—an authenticator is code that may receive messages that either request a new credential or request that an existing credential be validated; and policies—security policies at both the network and content peer group level may provide a comprehensive security model that controls peer-to-peer communication as well as content sharing.

In one embodiment, all messages may include a network peer group credential that identifies the sender of the message as a full member in good standing. In addition to this low-level communication credential, content peer groups may define membership credentials that define a member's rights, privileges, and role within the group and content access and sharing credentials that define a member's rights to the content stored within the group.

Figure 11:
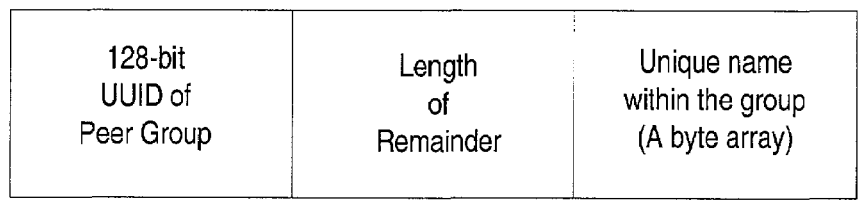
FIG. 11 illustrates an exemplary content identifier according to one embodiment.

One motivation for grouping peers together is to share content. Types of content items that may be shared include, but are not limited to, text files, structured documents such as PDF and XML files, and active content like a network service. In one embodiment, content may be shared among group members, but not groups, and thus no single item of content may belong to more than one group. In one embodiment, each item of content may have a unique identifier also known as its canonical name. This name may include a peer group universal unique identifier (UUID) and another name that may be computed, parsed, and maintained by peer group members. In one embodiment, the content's name implementation within the peer group is not mandated by the peer-to-peer platform. The name may be a hash code, a URI, or a name generated by any suitable means of uniquely identifying content within a peer group. The entire canonical content name may be referred to as a content identifier. FIG. 11 illustrates an exemplary content identifier according to one embodiment. In one embodiment, a content item may be advertised to make the item's existence known and available to group members through the use of content advertisements.

Each peer group member may share content with other members using a sharing policy that may name or rely on a sharing protocol. The default content sharing protocol may be a standard peer group sharing protocol of the peer-to-peer platform. Higher-level content systems such as file systems and databases may be layered upon the peer group sharing protocol. In on embodiment, the peer group sharing protocol is a standard policy embodied as a core protocol. In one embodiment, higher-level content protocols are optional and may be mandated by a custom policy and not the peer-to-peer platform.

Figure 12:
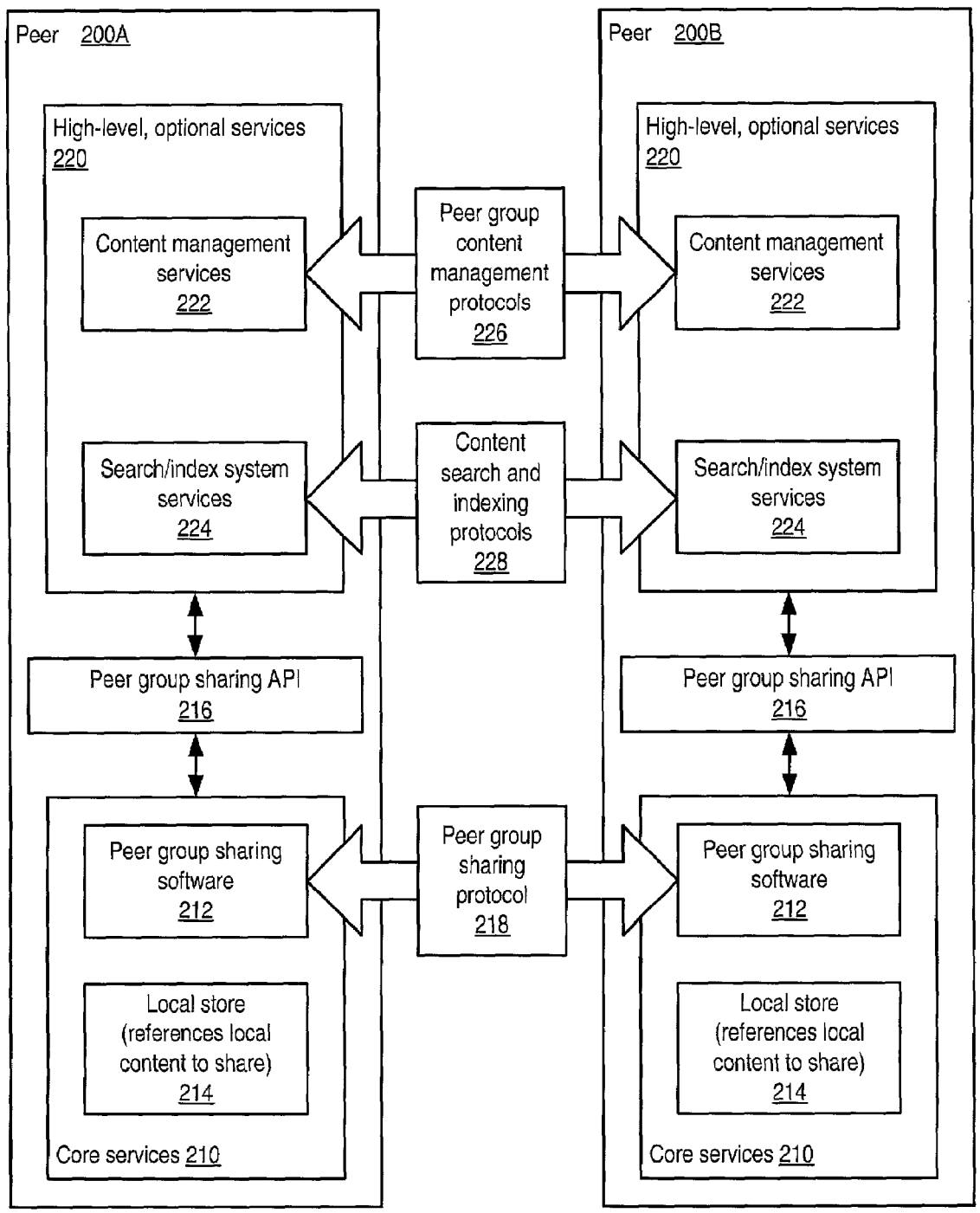
FIG. 12 is a block diagram illustrating two peers using a layered sharing policy and protocols to share content according to one embodiment.

FIG. 12 is a block diagram illustrating two peers using a layered sharing policy and several protocols to share content according to one embodiment. Each peer 200 includes core services 210 and one or more high-level, optional services 220. Core services 210 may include peer group sharing software that may be used to access a local store 214 (e.g. sharable content). High-level services 220 may include such services as the content management services 222 and the search and index system services 224 of this illustration. The core services 210 and high-level services 220 interface through a peer group sharing API 216 to the peer group sharing software 212. The peer group sharing software 212 on the two peers 200 may interface to each other using the low-level peer group sharing protocol 218. High-level services 220 may interface using higher-level protocols. For example, the content management services 222 on the two peers may interface using peer group content management protocols 226, and the search and index system services 224 may interface using content search and indexing protocols 228.

An instance of content may be defined as a copy of an item of content. Each content copy may reside on a different peer in the peer group. The copies may differ in their encoding type. HTML, XML and WML are examples of encoding types. These copies may have the same content identifier, and may even exist on the same peer. An encoding metadata element may be used to differentiate the two copies. Each copy may have the same content identifier as well as a similar set of elements and attributes. Making copies of content on different peers may help any single item of content be more available. For example, if an item has two instances residing on two different peers, only one of the peers needs to be alive and respond to the content request. In one embodiment, whether to copy an item of content may be a policy decision that may be encapsulated in higher-level applications and services.

One embodiment of the peer-to-peer platform may provide a content management service. A content management service is a non-core (high-level) service that uses the peer group sharing protocol to facilitate content sharing. In one embodiment, the peer group sharing protocol does not mandate sharing policies regarding the replication of content, the tracking of content, metadata content (including indexes), and content relationship graphs (such as a hierarchy). In one embodiment, the content management service may provide these extra features.

Items of content that represent a network service may be referred to as active content. These items may have additional core elements above and beyond the basic elements used for identification and advertisement. Active content items may be recognized by Multi-Purpose Internet Mail Extensions (MIME) content type and subtype. In one embodiment, all peer-to-peer platform active contents may have the same type. In one embodiment, the subtype of an active content may be defined by network service providers and may be used to imply the additional core elements belonging to active content documents. In one embodiment, the peer-to-peer platform may give latitude to service providers in this regard, yielding many service implementation possibilities. Some typical kinds of elements associated with a network service may include, but are not limited to:

lifecycle elements—an instance of active content may adhere to a lifecycle. A lifecycle element defines a set of behavior states such as started and stopped. The lifecycle element may itemize the service's lifecycle and a set of instructions used to manipulate the lifecycle;

runtime elements—runtime elements define the set of local peer runtimes in which this active content can execute (e.g. Java, Solaris, win32 . . . );

user interface elements—a user interface element defines the policy or policies by which a user interface is displayed;

configuration elements—a configuration element defines the policy or policies by which the service may be configured; and Storage elements—a storage element defines the policy or policies the service may use for persistent and/or transient storage.

As previously discussed, each peer may have a core protocol stack, a set of policies and one or more services. In one embodiment, the peer-to-peer platform may define a standard service advertisement. In one embodiment, the standard service advertisement may include lifecycle, runtime, and configuration elements.

Some services may be applications. An application may have a user interface element and a storage element in addition to the lifecycle, runtime, and configuration elements. In one embodiment, a service advertisement may also include startup information. The startup information may direct the local core peer software as to how and when to start the service. For example, some services may be marked (in the advertisement) to start at boot, while others may be marked to start when a message arrives in a specific advertised pipe. In one embodiment, services marked to start when a message arrives in a specific advertised pipe may be used to implement daemon services that block in the background awaiting a message to arrive in an input pipe.

In one embodiment, the peer-to-peer platform recognizes two levels of network services: peer services and peer group services. Each level of service may follow the active content typing and advertisement paradigm, but each level may provide a different degree (level) of reliability. In one embodiment, a peer service may execute on a single peer network node only. If that node happens to fail, the service fails too. This level of service reliability may be acceptable for an embedded device, for example, providing a calendar and email client to a single user. A peer group service, on the other hand, may include a collection of cooperating peer services. If one peer service fails, the collective peer group service may not be affected, because chances are that one or more of the other peer services are healthy. Thus, a peer group service may provide consumers (client peers) a highly reliable, fault-tolerant cluster of identical service implementations, servicing multiple concurrent peer requests. Services of this kind may be defined as content within the peer group. Specific service instances (as represented by service advertisements) may be obtained using the peer information protocol. In one embodiment, peers have the option of contacting a specific service instance using the peer information protocol, or by contacting a group of services through a special active content policy.

One embodiment of the peer-to-peer platform may use advertisements. Advertisements are language-neutral abstract data structures. In one embodiment, advertisements may be defined in a markup language such as XML. In one embodiment, in accordance with a software platform binding, advertisements may be converted to and from native data structures such as Java objects or 'C' structs. In one embodiment, each protocol specification may describe one or more request and response message pairs. Advertisements may be documents exchanged in messages. The peer-to-peer platform may defines standard advertisement types including, but not limited to, policy advertisements, peer advertisements, peer group advertisements, pipe advertisements, service advertisements, and content advertisements. In one embodiment, subtypes may be formed from these basic types using schemas (e.g. XML schemas). Subtypes may add extra, richer metadata such as icons. In one embodiment, the peer-to-peer platform protocols, policies, and core software services may operate only on the basic abstract types.

In one embodiment, all peer-to-peer platform advertisements are represented in XML. XML may provide a means of representing data and metadata throughout a distributed system. XML may provide universal (software-platform neutral) data because it may be language agnostic, self-describing, strongly-typed and may ensure correct syntax. In one embodiment, the peer-to-peer platform may use XML for platform resource advertisements and for defining the messages exchanged in the protocol set. Existing content types (MIME) may be described using a level of indirection called metadata. All XML Advertisements may be strongly typed and validated using XML schemas. In one embodiment, only valid XML documents that descend from the base XML advertisement types may be accepted by peers supporting the various protocols requiring that advertisements be exchanged in messages. Another feature of XML is its ability to be translated in to other encodings such as HTML and WML. In one embodiment, this feature of XML may be used to provide support for peers that do not support XML to access advertised resources.

In one embodiment, advertisements may be composed of a series of hierarchically arranged elements. Each element may contain its data and/or additional elements. An element may also have attributes. Attributes may be name-value string pairs. An attribute may be used to store metadata, which may be used to describe the data within the element.

In one embodiment, peer-to-peer platform advertisements may contain elements including, but not limited to:

default language encoding element—in one embodiment, all human readable text strings are assumed to be of this encoding, unless otherwise denoted. As an example:
<default Language>en-CA</default Language> resource name (canonical name string containing a UUID)—in one embodiment, a unique 128-bit number naming the resource within the platform; and one or more <Peer Endpoint> elements used to access the resource. Peer endpoint elements may contain a network transport name (for example, a string followed by a '://') and a Peer address on transport (for example, a string).

Peer-to-peer platform advertisements may also contain one or more optional elements including, but not limited to, a resource provider description element and a resource provider security policy element. A resource provider description element may be a standard element that describes the provider of the resource. A resource provider security policy element may be a standard element that describes the provider's security.

A resource provider description element may include, but is not limited to:
- a title (non-canonical string suitable for UI display)
- a provider name (canonical name string containing a UUID)
- a version (a string)
- a URI to obtain additional Info (a string)

For example, a light switch service provider's description element might be:

<title>ABC Programmable Lighting Switch</title>
<provider>ABC, an XYZ Company</provider>
<version>1.0</version>
<additionalInfo>http://www.XYZ.Com/ABC/x10/</additionalInfo>

In one embodiment, the same set of descriptive information (title, provider name, version, and additional info URI) may be used throughout all advertisement types to describe the particular provider.

A resource provider security policy element may include, but is not limited to:
- an authentication policy—an embedded policy advertisement that describes the manner in which this provider authenticates others; and
- a credentialing policy—an embedded policy advertisement. The provider's credentialing policy for enabling others to authenticate the provider.

A policy advertisement may describe a behavior, convention, or rule necessary to interact with a platform resource such as a pipe, service, or peer group. FIG. 13 illustrates one embodiment of a policy advertisement. A policy advertisement may be used to help find the proper policy implementation for the requesting peer. This advertisement document may be embedded in other types of advertisements. Policy statements made by this document may apply to any resource, service, or peer group in the platform. Policy and security are orthogonal concepts to peers, peer groups 304, content, and services in the peer-to-peer platform.

A peer advertisement describes a peer network node within the peer-to-peer platform. FIG. 14 illustrates one embodiment of a peer advertisement. A peer advertisement may be used to help find the proper policy implementation for the requesting peer.

A peer group advertisement describes a collection of cooperating peers. FIG. 15 illustrates one embodiment of a peer group advertisement. A peer group advertisement may define the group membership process. In one embodiment, more than one kind of peer group advertisements may exist for a single group. In one embodiment, some basic kinds of peer group advertisement (with information for non-members only) may be published most often on the platform. In one embodiment, the only common elements found in all kinds of peer group advertisements is one or more standard peer-to-peer platform policies. Once a peer joins a group, that peer may receive (depending upon the membership policy) a full membership-level advertisement. The full membership advertisement, for example, might include the policy (may be required of all members) to vote for new member approval.

A pipe advertisement describes an instance of a peer-to-peer communication channel. FIG. 16 illustrates one embodiment of a pipe advertisement. In one embodiment, a pipe advertisement document may be published and obtained using either the content sharing protocol or by embedding it within other advertisements such as a peer group advertisement.

A service advertisement describes an instance of peer behavior or protocol. FIG. 17 illustrates one embodiment of a service advertisement. In one embodiment, the core services, for example, are made available to the platform by publishing a service advertisement. This advertisement document may be published and obtained using the peer information protocol. In one embodiment, service advertisements may include one or more access policies that describe how to activate and/or use the service. The core peer services (that each peer implements in order to respond to protocol messages) may advertise their existence in this manner. In one embodiment, the access method for the core services may be a schema of valid XML messages accepted by the service.

A content advertisement describes an item of content stored somewhere in a peer group. FIG. 18 illustrates one embodiment of a content advertisement. A content advertisement may be obtained using the peer group sharing protocol. In one embodiment, all items of content have a content identifier. A content identifier may be a unique identifier also known as its canonical name. This name may include a peer group UUID and another name computed, parsed, and maintained by peer group members only. The content's name implementation within the peer group is not mandated by peer-to-peer platform. The name may be a hash code, a URI, or any suitable means of uniquely identifying content within a peer group. The entire canonical content name is referred to as a content identifier.

An item of content's data may be encoded "by value." In other words, the item contains an in-line document that holds the content's data. Alternatively, an item of content's data may be encoded "by reference." In other words, the item contains a URI referencing the actual document holding the data. A size element may be provided for items of content. In one embodiment, the size is the total size of the content in bytes. In one embodiment, the size is a long (unsigned 64-bits).

The "size", "by-value" and "by-reference" elements are three kinds of elements that may be stored in a content advertisement document. An unlimited number of other types of elements may be added to a content advertisement. An item of content may also contain elements including, but not limited to:
- type element—the MIME type (encoding is deduced from type) of the in-line or referenced data.
- aboutID element—if the advertised content is another advertisement (based upon its type), this is the content identifier of the referenced content. Otherwise, the element doesn't exist.
- Peer identifier element—if the advertised content is another advertisement (based upon its type), this is the peer endpoint (which is bound to a pipe) on which a specific instance of the content (identified by aboutID) may exist. In one embodiment, if an advertisement is to refer to no particular instance of content, this field may be NULL or the element doesn't exist. This field may be used to help the advertisement dereferencing process. Given the unreliable nature of peers, any peer named here may in fact not be available. When the referenced peer isn't available, a search of the peer group may be performed (e.g. by a content management service) to find another suitable instance of the same content by matching the content identifier named in the aboutID element.

Figure 19:
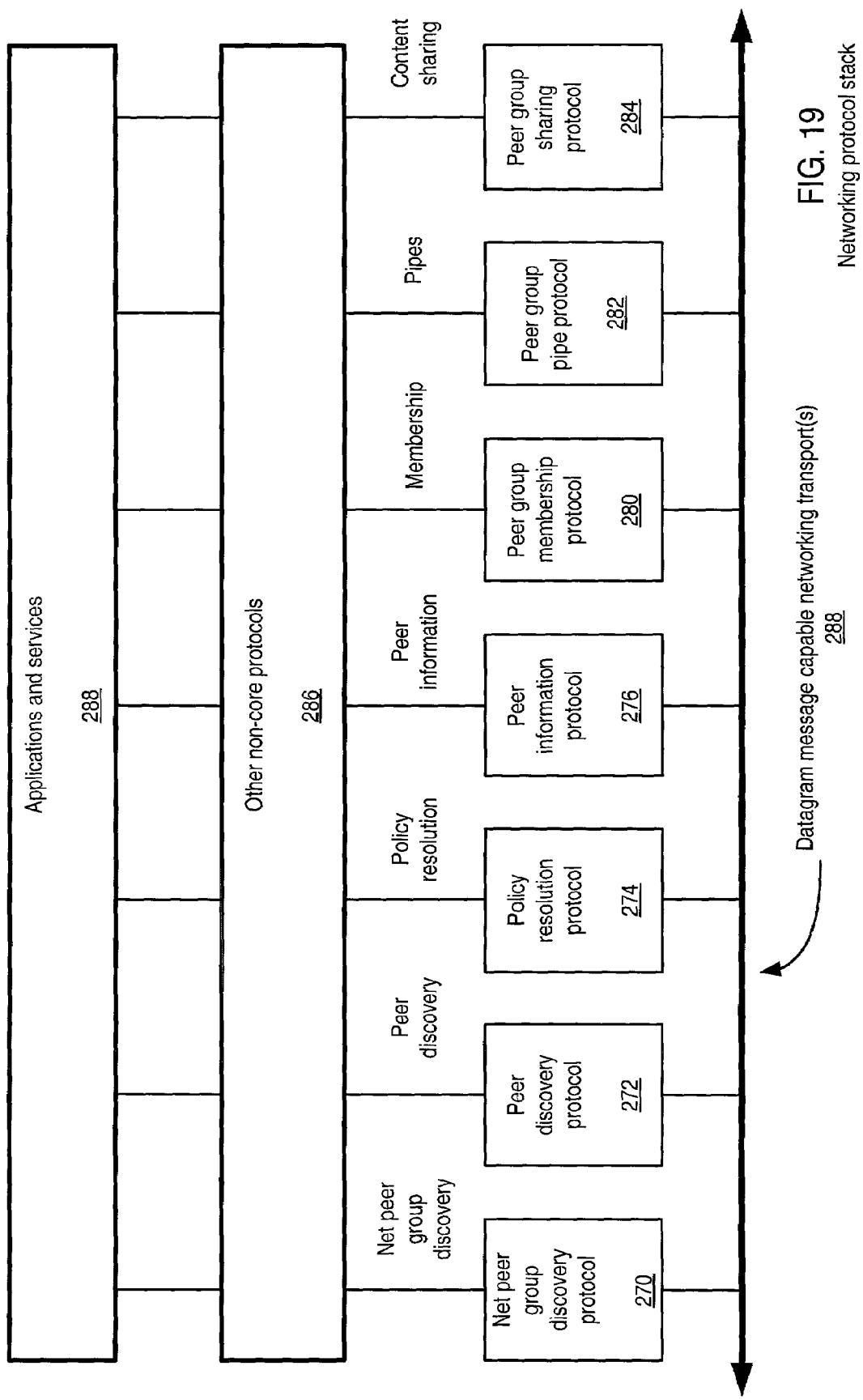
FIG. 19 is a block diagram illustrating one embodiment of a network protocol stack in a peer-to-peer platform.

FIG. 19 is a block diagram illustrating one embodiment of a network protocol stack in a peer-to-peer platform. In this embodiment, the peer-to-peer platform may include, but is not limited to, the following networking protocols:

- a network peer group discovery protocol 270 that allows a peer to discover and establish abstract network regions.
- a peer discovery protocol 272 that allows a peer to discover other peers and peer groups 304. This protocol may be used to find members of any kind of peer group, presumably to request membership.
- a policy resolution protocol 274 that allows a peer to find an implementation of a peer group behavior suitable for its node type (e.g. Java or native).
- a peer information protocol 276 that allows a peer to learn about other peers' capabilities and status.
- a peer group membership protocol 280 that allows a peer to join or leave peer groups 304, and to manage membership policies, rights and responsibilities.
- a peer group pipe protocol 282 that allows a peer group member to communicate with other members by exchanging Datagram messages, for example, on a Datagram message capable networking transport 288.
- a peer group content sharing protocol 284 that allows peer group members to share content.

Other embodiments may include other networking protocols, and/or may not include some of the protocols described in this embodiment.

As illustrated in FIG. 19, the core networking protocols 270–284 may be used as a basis for constructing other non-core protocols 286. Applications and services 288 may then be constructed that may use the core and non-core protocols to participate in the peer-to-peer platform.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing a distributed information discovery platform that enables discovery of up-to-date information from distributed information providers have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A distributed network search method, comprising:
   receiving a query request from a consumer, wherein the query request includes a search query, wherein the query request is formatted according to a query routing protocol;
   resolving the search query with an index of provider registrations to select one or more provider registrations;
   routing the search query to at least one provider specified by the one or more selected provider registrations, wherein the search query is routed to the at least one provider according to the query routing protocol;
   receiving a query response from said at least one provider, wherein the query response includes search results;
   routing the search results to the consumer.

2. The method as recited in claim 1, wherein the query response is formatted according to the query routing protocol, wherein the query routing protocol specifies a mark-up language format for communicating query requests and query responses.

3. The method as recited in claim 2, wherein the markup language is eXtensible Markup Language (XML).

4. The method as recited in claim 1, wherein said search query comprises:
   an indication of a query-space, wherein the query-space defines a structure for indicating and matching search criteria; and
   search criteria structured according to the indicated query-space.

5. The method as recited in claim 4, wherein each provider registration comprises:
   an indication of a query-space, wherein the query-space defines a structure for indicating and matching search criteria;
   a predicate statement structured according to the indicated query-space, wherein the predicate statement defines matching search criteria; and
   a query server address to which matching search queries are to be directed.

6. The method as recited in claim 5, wherein said resolving comprises:
   applying the search criteria from the search query to the provider registrations indicating the same query-space as the search query; and
   selecting the provider registrations that have both the same query-space as said search query and a predicate statement matching the search criteria from the search query.

7. The method as recited in claim 6, wherein said routing the search query to at least one provider specified by the one or more selected provider registrations comprises routing the search query to the query server addresses specified by the one or more of the provider registrations selected by said resolving.

8. The method as recited in claim 1, wherein said receiving a query response from at least one provider comprises collating search results received from a plurality of providers, and wherein said routing the search results comprises routing the collated search results to the consumer.

9. The method as recited in claim 1, further comprising:
   receiving registration requests from a plurality of providers, wherein each registration request comprises a registration file, wherein the registration file comprises an address and a definition of search queries to be sent to the address; and
   storing the registration files in the index of provider registrations.

10. The method as recited in claim 9, wherein the registration requests, the query request and the query response are all formatted according to the query routing protocol, wherein the query routing protocol specifies a mark-up language format for communicating query requests, query responses and registration requests.

11. The method as recited in claim 10, wherein the markup language is eXtensible Markup Language (XML).

12. The method as recited in claim 1, wherein said receiving a query request from a consumer, said resolving the search query with an index of provider registrations, said routing the search query to at least one provider, said receiving a query response from said at least one provider, and said routing the search results to the consumer implement deep search of said at least one provider on the distributed network.

13. The method as recited in claim 1, wherein said receiving a query request from a consumer, said resolving the search query with an index of provider registrations, said routing the search query to at least one provider, said receiving a query response from said at least one provider, and said routing the search results to the consumer implement wide search of the distributed network.

14. The method as recited in claim 1, wherein the search results include information in text format.

15. The method as recited in claim 1, wherein the search results include information in audio format.

16. The method as recited in claim 1, wherein the search results include information in video format.

17. The method as recited in claim 1, wherein the search results include information in image format.

18. A network hub coupled to a network, comprising:
a router configured to receive query requests from consumers coupled to the network, wherein each query request includes a search query;
a resolver coupled to said router, wherein said resolver is configured to receive the search queries from said router, and wherein said resolver is further configured to access a provider registration index and resolve each search query with the provider registration index to select one or more provider registrations for each search query;
wherein at least one of the one or more provider registrations is for a second network hub coupled to the network, wherein the second network hub is configured to route search Queries to one or more providers indicated by the at least one of the one or more provider registrations; and
wherein said router is further configured to receive from said resolver an indication of one or more providers selected for each search query and route each search query to the one or more selected providers for that search query.

19. The network hub as recited in claim 18, wherein said router is further configured to receive query responses from providers coupled to the network, wherein each query response includes a search query ID and search results.

20. The network hub as recited in claim 19, wherein for each query request said router is further configured to collate the search results received from providers and route the collated search results to the consumer that sent the query request.

21. The network hub as recited in claim 19, wherein the search results include one or more of text, audio, video and image information.

22. The network hub as recited in claim 19, wherein the router is further configured to receive the query requests and query responses according to a query routing protocol, wherein the query routing protocol specifies a markup language format for communicating query requests and query responses.

23. The network hub as recited in claim 22, wherein the markup language is eXtensible Markup Language (XML).

24. The network hub as recited in claim 18, wherein each search query comprises:
an indication of a query-space, wherein the query-space defines a structure for indicating and matching search criteria; and
search criteria structured according to the indicated query-space.

25. The network hub as recited in claim 24, wherein each provider registration comprises:
an indication of a query-space, wherein the query-space defines a structure for indicating and matching search criteria;
a predicate statement structured according to the indicated query-space, wherein the predicate statement defines matching search criteria; and
a query server address to which matching search queries are to be directed.

26. The network hub as recited in claim 25, wherein for each search query said resolver is further configured to:
apply the search criteria from the search query to the provider registrations indicating the same query-space as the search query; and
select the provider registrations that have both the same query-space as said search query and a predicate statement matching the search criteria from the search query.

27. The network hub as recited in claim 26, wherein said router is configured to route each search query to the query server addresses specified by one or more of the provider registrations selected by said resolver.

28. The network hub as recited in claim 18, wherein said router is further configured to:
receive registration requests from a plurality of providers, wherein each registration request comprises a registration file, wherein the registration file comprises an address and a definition of search queries to be sent to the address; and
store the registration files in the index of provider registrations.

29. The network hub as recited in claim 18, wherein the router is configured to receive the registration requests according to a query routing protocol, wherein the query routing protocol specifies a markup language format for communicating query requests, query responses and registration requests.

30. The network hub as recited in claim 29, wherein the markup language is eXtensible Markup Language (XML).

31. A tangible, computer-accessible medium comprising program instructions, wherein the program instructions are computer-executable to implement:
receiving a query request from a consumer, wherein the query request includes a search query, wherein the query request is formatted according to a query routing protocol;
resolving the search query with an index of provider registrations to select one or more provider registrations;
routing the search query to at least one provider specified by the one or more selected provider registrations, wherein the search query is routed to the at least one provider according to the query routing protocol;
receiving a query response from said at least one provider, wherein the query response includes search results; and
routing the search results to the consumer.

32. The tangible, computer-accessible medium as recited in claim 31, wherein the query response is formatted according to the query routing protocol, wherein the query routing protocol specifies a markup language format for communicating query requests and query responses.

33. The tangible, computer-accessible medium as recited in claim 32, wherein the markup language is eXtensible Markup Language (XML).

34. The tangible, computer-accessible medium as recited in claim 31, wherein said search query comprises:
an indication of a query-space, wherein the query-space defines a structure for indicating and matching search criteria; and
search criteria structured according to the indicated query-space.

35. The tangible, computer-accessible medium as recited in claim 34, wherein each provider registration further comprises:
an indication of a query-space, wherein the query-space defines a structure for indicating and matching search criteria, and wherein the predicate statement is structured according to the indicated query-space; and
a query server address to which matching search queries are to be directed.

36. The tangible, computer-accessible medium as recited in claim 35, wherein said resolving comprises:
applying the search criteria from the search query to the provider registrations indicating the same query-space as the search query; and
selecting the provider registrations that have both the same query-space as said search query and a predicate statement matching the search criteria from the search query.

37. The tangible, computer-accessible medium as recited in claim 36, wherein said routing the search query to at least one provider specified by the one or more selected provider registrations comprises routing the search query to the query server addresses specified by the one or more of the provider registrations selected by said resolving.

38. The tangible, computer-accessible medium as recited in claim 31, wherein said receiving a query response from at least one provider comprises collating search results received from a plurality of providers, and wherein said routing the search results comprises routing the collated search results to the consumer.

39. The tangible, computer-accessible medium as recited in claim 31, wherein the program instructions are further computer-executable to implement:
receiving registration requests from a plurality of providers, wherein each registration request comprises a registration file, wherein the registration file comprises an address and a definition of search queries to be sent to the address; and
storing the registration files in the index of provider registrations.

40. The tangible, computer-accessible medium as recited in claim 39, wherein the registration requests, the query request and the query response are all formatted according to a query routing protocol, wherein the query routing protocol specifies a markup language format for communicating query requests, query responses and registration requests.

41. The tangible, computer-accessible medium as recited in claim 40, wherein the markup language is eXtensible Markup Language (XML).

42. A network hub coupled to a network, comprising:
means for routing query requests received from consumers coupled to the network, wherein each query request includes a search query;
means for resolving the search queries, wherein said means for resolving are configured to:
receive the search queries from said means for routing;
access a provider registration index; and
resolve each search query with the provider registration index to select one or more provider registrations for each search query, wherein at least one of the one or more of the provider registrations is for a second network hub coupled to the network, wherein the second network hub comprises means to route search queries to one or more providers indicated by the at least one of the one or more provider registrations;
wherein said means for routing are further configured to:
receive from said means for resolving an indication of one or more providers selected for each search query; and
route each search query to the one or more selected providers for that search query.

43. The network hub as recited in claim 42, wherein said means for routing are further configured to receive query responses from providers coupled to the network, wherein each query response includes a search query identifier and search results.

44. The network hub as recited in claim 43, wherein the search results include one or more of text, audio, video and image information.

45. The network hub as recited in claim 43, wherein said means for routing are further configured to receive the query requests and query responses according to a query routing protocol, wherein the query routing protocol specifies a markup language format for communicating query requests and query responses.

46. The network hub as recited in claim 45, wherein the markup language is eXtensible Markup Language (XML).

47. The network hub as recited in claim 42, wherein each search query comprises:
an indication of a query-space, wherein the query-space defines a structure for indicating and matching search criteria; and
search criteria structured according to the indicated query-space.

48. The network hub as recited in claim 47, wherein each provider registration comprises:
an indication of a query-space, wherein the query-space defines a structure for indicating and matching search criteria;
a predicate statement structured according to the indicated query-space, wherein the predicate statement defines matching search criteria; and
a query server address to which matching search queries are to be directed.

49. The network hub as recited in claim 48, wherein for each search query said means for resolving are further configured to:
apply the search criteria from the search query to the provider registrations indicating the same query-space as the search query; and
select the provider registrations that have both the same query-space as said search query and a predicate statement matching the search criteria from the search query.

50. The network hub as recited in claim 49, wherein said means for routing are further configured to route each search query to the query server addresses specified by one or more of the provider registrations selected by said means for resolving.

51. The network hub as recited in claim 42, wherein said means for routing are further configured to:
    receive registration requests from a plurality of providers, wherein each registration request comprises a registration file, wherein the registration file comprises an address and a definition of search queries to be sent to the address; and
    store the registration files in the index of provider registrations.

52. The network hub as recited in claim 42, wherein said means for routing are further configured to receive the registration requests according to a query routing protocol, wherein the query routing protocol specifies a markup language format for communicating query requests, query responses and registration requests.

* * * * *